(12) United States Patent
Tanaka et al.

(10) Patent No.: US 8,991,579 B2
(45) Date of Patent: Mar. 31, 2015

(54) CLUTCH DEVICE

(75) Inventors: Satoshi Tanaka, Hirakata (JP); Yusuke Tomita, Neyagawa (JP)

(73) Assignee: EXEDY Corporation, Osaka (JP)

( * ) Notice: Subject to any disclaimer, the term of this patent is extended or adjusted under 35 U.S.C. 154(b) by 49 days.

(21) Appl. No.: 13/880,315

(22) PCT Filed: Aug. 23, 2011

(86) PCT No.: PCT/JP2011/068919
§ 371 (c)(1),
(2), (4) Date: Apr. 18, 2013

(87) PCT Pub. No.: WO2012/053281
PCT Pub. Date: Apr. 26, 2012

(65) Prior Publication Data
US 2013/0206531 A1  Aug. 15, 2013

(30) Foreign Application Priority Data

Oct. 22, 2010  (JP) ................................. 2010-237172
Nov. 19, 2010  (JP) ................................. 2010-259397

(51) Int. Cl.
*F16D 21/00* (2006.01)
*F16D 13/58* (2006.01)
*F16D 21/06* (2006.01)

(52) U.S. Cl.
CPC .............. *F16D 21/00* (2013.01); *F16D 13/585* (2013.01); *F16D 21/06* (2013.01); *F16D 2021/0684* (2013.01)
USPC ................... 192/48.8; 192/48.606; 192/70.29

(58) Field of Classification Search
None
See application file for complete search history.

(56) References Cited

U.S. PATENT DOCUMENTS

| 3,181,668 | A | * | 5/1965 | Siuk .............................. 192/48.9 |
| 6,620,840 | B1 | | 9/2003 | Bigg et al. |
| 7,124,871 | B2 | * | 10/2006 | Friedmann et al. .......... 192/99 S |
| 7,493,997 | B2 | * | 2/2009 | Meinhard et al. ........... 192/30 V |
| 7,784,573 | B2 | * | 8/2010 | Kluge et al. ................ 180/65.22 |
| 2002/0060118 | A1 | | 5/2002 | Beneton et al. |
| 2002/0144875 | A1 | * | 10/2002 | Dau et al. ..................... 192/48.8 |
| 2011/0233021 | A1 | * | 9/2011 | Friedmann et al. .......... 192/48.8 |

FOREIGN PATENT DOCUMENTS

| JP | S48-33945 U | 4/1973 |
| JP | S48-33946 U | 4/1973 |
| JP | S59-136034 U | 9/1984 |
| JP | 07-042761 A | 2/1995 |
| JP | 2002-174262 A | 6/2002 |
| JP | 2007-092821 A | 4/2007 |

\* cited by examiner

*Primary Examiner* — Ramya Burgess
*Assistant Examiner* — Mark Manley
(74) *Attorney, Agent, or Firm* — Global IP Counselors, LLP

(57) ABSTRACT

A clutch device includes a first clutch, a second clutch, a diaphragm spring and an intermediate spring. The diaphragm spring transmits a pressing force to the first clutch and the second clutch. The intermediate spring applies a coupling maintaining force to the first clutch and the second clutch so that minimally power transmitted states of the first clutch and the second clutch are maintained while a pressing force is not being applied to the first clutch and the second clutch.

15 Claims, 21 Drawing Sheets

CLUTCH DEVICE

CROSS-REFERENCE TO THE RELATED APPLICATIONS

This U.S. national phase application claims priority to Japanese Patent Application Nos. 2010-237172 and 2010-259397 filed on Oct. 22, 2010 and Nov. 19, 2010 respectively. The entire disclosure of Japanese Patent Application Nos. 2010-237172 and 2010-259397 is hereby incorporated herein by reference

TECHNICAL FIELD

The present invention relates to a clutch device for transmitting power from an engine to a transmission.

BACKGROUND ART

Automatic transmissions (ATs) have been known as means for automatically shifting gears of vehicles. In recent years, a mainstream type of the ATs has a combinational structure of, for instance, a torque converter, a plurality of planet gears and a plurality of clutches. Such a type of AT does not require a driver to perform clutch operations, normally required in manual transmissions (MTs), in starting moving a vehicle, stopping a vehicle and shifting gears due to a continuous gear shifting action by the torque converter and an automatic switching among the plural clutches.

However, torque converters are configured to transmit power through fluid. Therefore, the power transmission efficiency of the ATs is lower than that of the MTs configured to mechanically couple the input side and the output side directly in transmitting torque. Therefore, the ATs have a drawback of degrading fuel consumption of the vehicles although having an advantage of reducing driver's effort.

In view of the above, automated manual transmissions (AMTs), structured based on the MTs, have been proposed for reliably achieving the transmission efficiency of the MTs, and simultaneously, eliminating the need of clutch operations. In the AMTs, the clutch operations of the MTs and the gear-shifting operations of the transmissions are automated. Therefore, the AMTs can reliably achieve a transmission efficiency equivalent to that of the well-known MTs, and simultaneously, eliminate the need of clutch operations.

However, the AMTS are configured to decouple the clutches in performing a gear-shifting operation similarly to the MTs and transmission of torque is thereby temporarily prevented. Vehicles travel only by inertia force without accelerating while transmission of torque is prevented. Such torque transmission prevention greatly affects the acceleration performance of vehicles and tends to make drivers feel uncomfortable.

In view of the above, AMTS employing a twin clutch device have been proposed for solving the drawback of the torque transmission prevention (see e.g., Patent Literature 1).

CITATION LIST

Patent Literature
PTL 1: Japan Laid-open Patent Application Publication No. JP-A-2002-174262
PTL 2: U.S. Pat. No. 6,620,840

SUMMARY

However, the clutch device described in Patent Literature 1 is configured to drive first and second clutches independently from each other with use of two actuators. Therefore, the device size is likely to be increased.

In view of this, it can be considered to provide only a set of a drive lever and an actuator and drive the first and second clutches by the single actuator.

However, in the case of the single actuator, torque transmission prevention is inevitably caused in switching power transmission states of the first and second clutches.

It is a first advantage of the present invention to provide a clutch device that can prevent torque transmission prevention and can be reduced in its size.

On the other hand, in the clutch device described in Patent Literature 2, a drive lever is supported by a member attached to an engine. Therefore, when driving force is transmitted from an actuator to the drive lever, the driving force is inevitably transmitted to the engine.

It is a second advantage of the present invention to provide a clutch device that can prevent driving force from acting on an engine and can be reduced in its size.

A clutch device according to a first characteristic is a clutch device for transmitting a power from an engine to first and second input shafts of a transmission, and includes a first clutch, a second clutch, a single lever member and an intermediate elastic member. The first clutch transmits a power from the engine to the first input shaft. The second clutch transmits a power from the engine to the second input shaft. The single lever member transmits a pressing force to the first and second clutches. The intermediate elastic member is configured to apply a coupling maintaining force to the first and second clutches so that minimally power transmitted states of the first and second clutches are maintained while the pressing force is not being applied to the first and second clutches.

Here, the single lever member can be formed by a single member, or alternatively, by a plurality of members. Further, the minimally power transmitted state refers to a state that the minimum power whereby a driver does not feel torque transmission prevention is being transmitted. For example, a creep power whereby a vehicle travels at a slow speed without pressing-down of an accelerator pedal can be exemplified as the minimum power.

In the clutch device, the intermediate elastic member is configured to apply the coupling maintaining force to the first and second clutches so that the minimally power transmitted states of the first and second clutches are maintained while the pressing force is not being applied to the first and second clutches. Therefore, torque transmission prevention can be prevented even when the first and second clutches are switched using the single lever member.

Further, the first and second clutches are driven by the single lever member. Therefore, it is required to provide only a single actuator. Accordingly, reduction in size of the device can be achieved.

Based on the above, according to the present clutch device, torque transmission prevention can be prevented, while reduction in size of the device can be achieved.

A clutch device according to a second characteristic is a clutch device for transmitting a power from an engine to first and second input shafts of a transmission, and includes: an input rotor that serves as a member to which a power is inputted from the engine and is rotatably supported by at least either of the first and second input shafts while being restricted from moving in at least either of axial directions by the first and second input shafts; a first clutch for transmitting a power inputted into the input rotor to the first input shaft; a second clutch for transmitting a power inputted into the input rotor to the second input shaft; and a single lever member that is supported by the input rotor and serves to transmit a pressing force to the first and second clutches.

Here, the single lever member can be formed by a single member, or alternatively, by a plurality of members.

In the present clutch device, the input rotor is restricted from moving in at least either of axial directions by the first and second input shafts. Therefore, even when an axial clutch driving force is inputted into the lever member, the first and second input shafts can receive the clutch driving force. Accordingly, the clutch driving force can be prevented from being transmitted to the engine.

Further, a pressing force is transmitted to the first and second pressure plate assemblies through the single lever member. Therefore, it is required to provide only one actuator. Accordingly, reduction in size of the device can be achieved.

Based on the above, according to the present clutch device, a clutch driving force can be prevented from being transmitted to the engine and reduction in size of the device can be achieved.

DETAILED DESCRIPTION OF THE PREFERRED EMBODIMENTS

First Exemplary Embodiment

Entire Structure of Clutch Device

Figure 1:
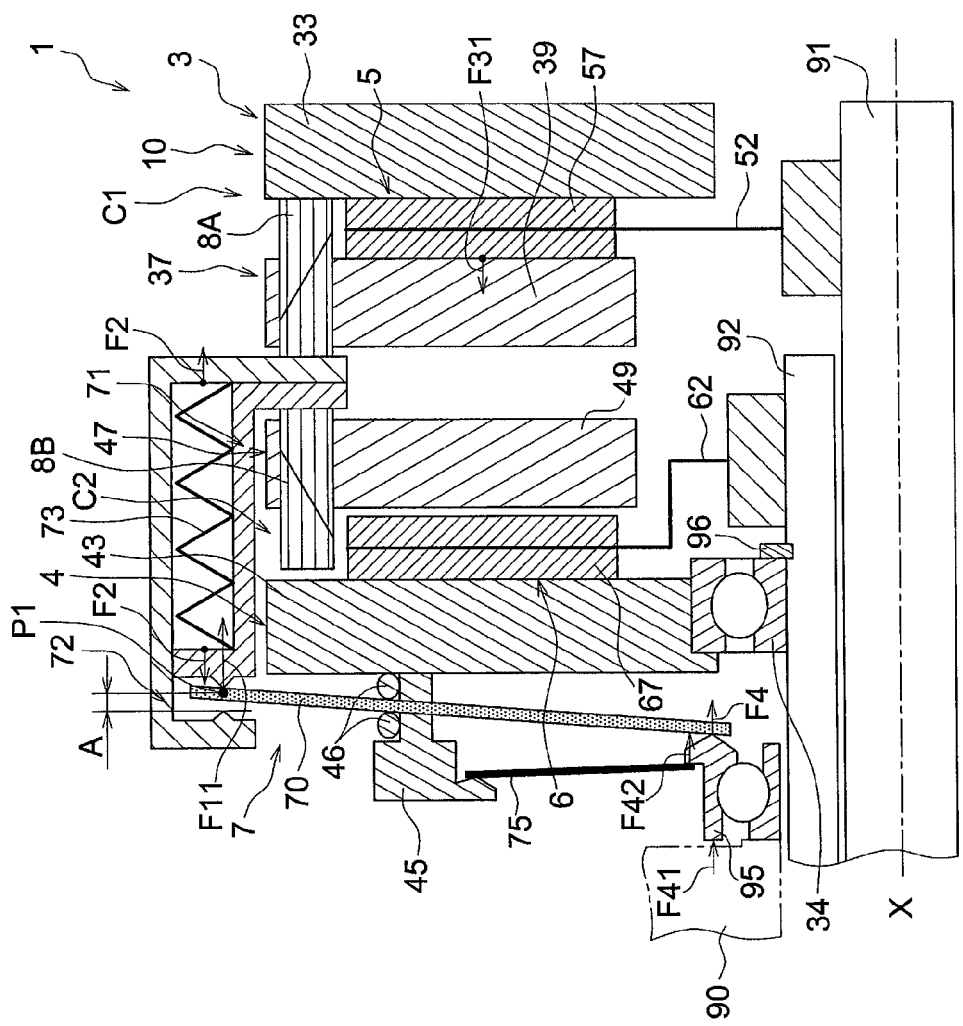
FIG. 1 is a cross-sectional view of a clutch device (a first clutch is set in an engaged state).
Figure 2:
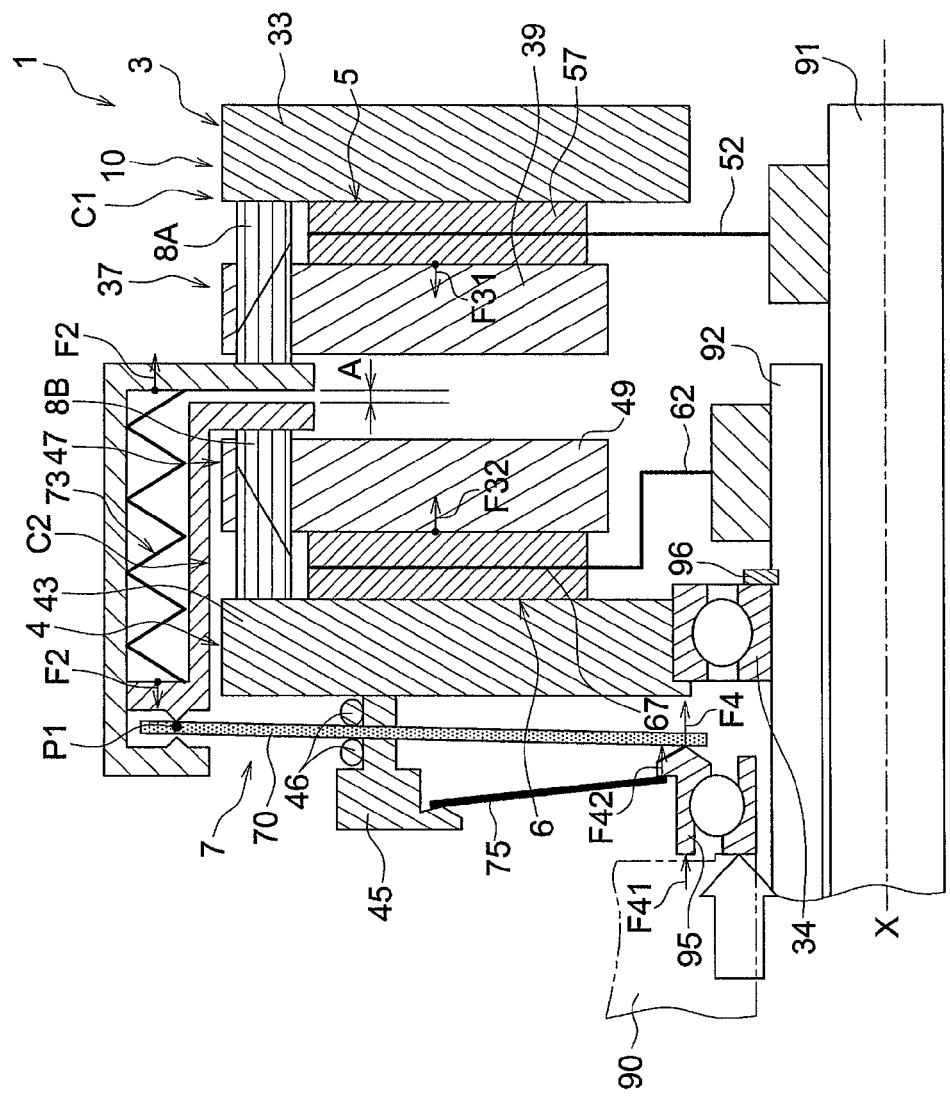
FIG. 2 is a cross-sectional view of the clutch device (the first clutch and a second clutch are both set in an engaged state).
Figure 3:
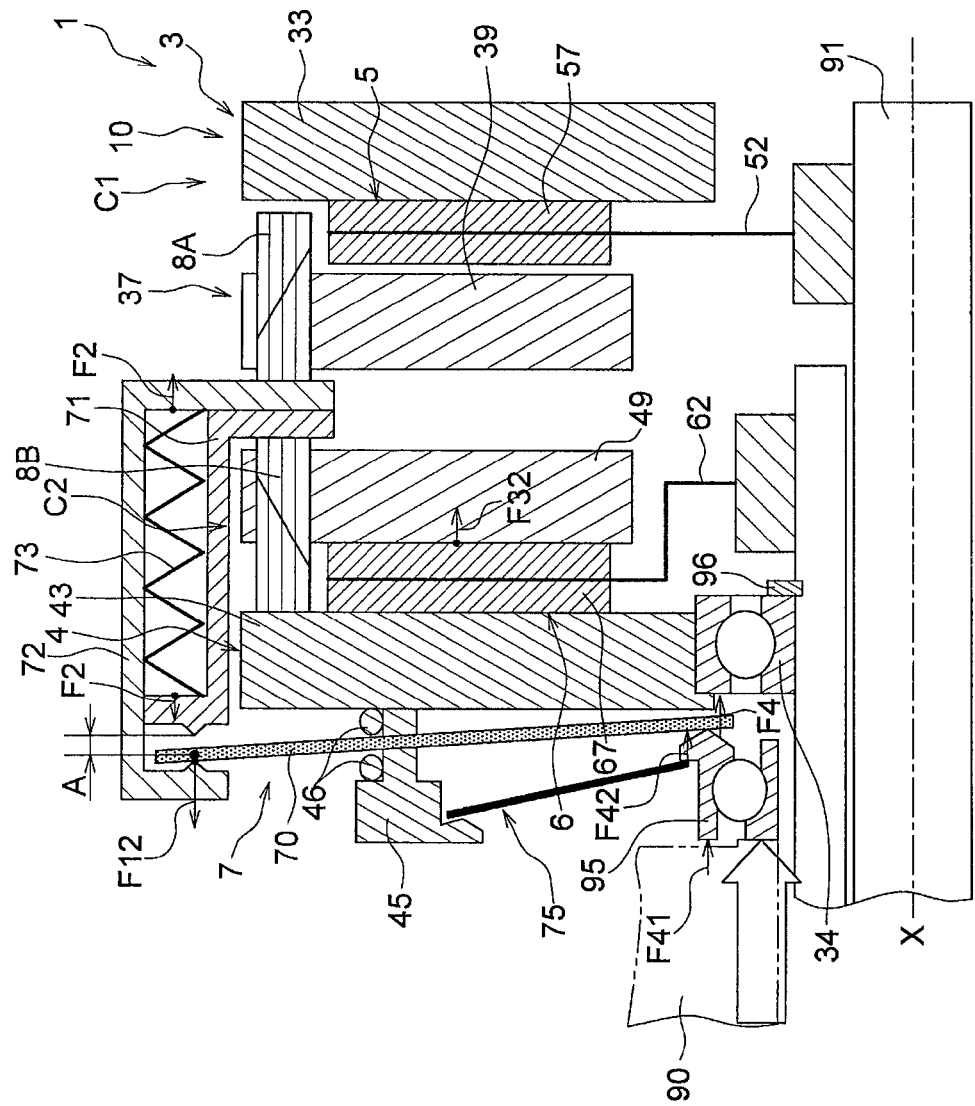
FIG. 3 is a cross-sectional view of the clutch device (the second clutch is set in an engaged state).

As illustrated in FIGS. 1 to 3, a clutch device 1 is a device for transmitting power from an engine to a first input shaft 91 and a second input shaft 92 of a transmission, and includes an input rotor 10, a first pressure plate assembly 37, a second pressure plate assembly 47, a first clutch disc assembly 5, a second clutch disc assembly 6, a first abrasion tracking mechanism 8A, a second abrasion tracking mechanism 8B and a drive mechanism 7. A first clutch C1 is formed by the input rotor 10 (in more detail, a first flywheel 3), the first pressure plate assembly 37 and the first clutch disc assembly 5. A second clutch C2 is formed by the input rotor 10 (in more detail, a second flywheel 4), the first pressure plate assembly 37 and the second clutch disc assembly 6. The first clutch C1 is a mechanism for transmitting power to the first input shaft 91 and is a clutch of a normal close type in the present exemplary embodiment. On the other hand, the second clutch C2 is a mechanism for transmitting power to the second input shaft 92 and is a clutch of a normal open type in the present exemplary embodiment. For example, the first clutch C1 is configured to transmit power at first, third and fifth speed stages, whereas the second clutch C2 is configured to transmit power at second and fourth speed stages. As described below, the first clutch C1 and the second clutch C2 share the drive mechanism 7. Therefore, reduction in size of the clutch device 1 is achieved.

It should be noted that, in the following explanation, the normal open type clutch is defined as a clutch that is not transmitting a required power from the engine to the transmission while driving force is not being applied thereto from an actuator, whereas the normal close type clutch is defined as a clutch that can transmit a required power from the engine to the transmission while driving force is not being applied thereto from the actuator. The required power is the one required for driving a vehicle and does not include a certain power to make a vehicle travel at a slow speed without pressing-down of an accelerator pedal (e.g., a creep power).

Further, in FIGS. 1 to 3, the engine is disposed on the right side of the clutch device 1, whereas the transmission is disposed on the left side of the clutch device 1, although not illustrated in the figures. Therefore, in FIGS. 1 to 3, an engine side refers to the right side, whereas a transmission side refers to the left side.

Input Rotor 10

The input rotor 10 is a member to which power is transmitted from the engine. The input rotor 10 is coupled to a crankshaft (not illustrated in the figures) through a flexible plate (not illustrated in the figures) and a damper (not illustrated in the figures). The input rotor 10 is rotated about a rotary axis X. The input rotor 10 mainly includes the first flywheel 3 and the second flywheel 4.

(1) First Flywheel 3

The first flywheel 3 has a first disc portion 33 having an annular shape. The first flywheel 3 is fixed to and unitarily rotated with the second flywheel 4.

(2) Second Flywheel 4

The second flywheel 4 has a second disc portion 43 having an annular shape. The second disc portion 43 is disposed axially away from the first disc portion 33 at a space. The second flywheel 4 is fixed to and unitarily rotated with the first flywheel 3. The second flywheel 4 is rotatably supported by the second input shaft 92 through a bearing 34. The bearing 34 is fixed to the inner peripheral part of the second flywheel 4. The bearing 34 also supports the first flywheel 3 in a rotatable state through the second flywheel 4. The bearing 34 is restricted from moving towards the engine by a snap ring 96 attached to the second input shaft 92. Accordingly, the input rotor 10 is restricted from moving towards the engine with respect to the second input shaft 92. The bearing 34 and the snap ring 96 receive driving force in switching the second clutch C2 into an engaged state.

First Pressure Plate Assembly 37

The first pressure plate assembly 37 includes a first pressure plate 39 and the first abrasion tracking mechanism 8A.

The first pressure plate 39 is an annular member for pressing the first clutch disc assembly 5 onto the first flywheel 3. The first pressure plate 39 is disposed axially between the first disc portion 33 and the second disc portion 43. The first pressure plate 39 is disposed while being unitarily rotatable with and axially movable with respect to the first disc portion 33. Specifically, the first pressure plate 39 is coupled to the first flywheel 3 by a first strap plate (not illustrated in the figures).

The first abrasion tracking mechanism 8A is a mechanism for reducing variation in a load characteristic of the first clutch C1 attributed to abrasion of a first friction portion 57 (to be described). The first abrasion tracking mechanism 8A is attached to the first pressure plate 39. The first abrasion tracking mechanism 8A is configured to detect the abrasion amount of the first friction portion 57 and axially shift a fulcrum position to be pressed by the drive mechanism 7 in accordance with the detected abrasion amount. Accordingly, the fulcrum position is hardly changed even when the first friction portion 57 is abraded. As a result, the load characteristic of the first clutch C1 is kept roughly constant.

Second Pressure Plate Assembly 47

The second pressure plate assembly 47 includes a second pressure plate 49 and the second abrasion tracking mechanism 8B.

The second pressure plate 49 is an annular member for pressing the second clutch disc assembly 6 onto the second flywheel 4. The second pressure plate 49 is disposed axially between the first disc portion 33 and the second disc portion 43. The second pressure plate 49 is disposed while being unitarily rotatable with and axially movable with respect to the second disc portion 43. Specifically, the second pressure plate 49 is coupled to the second flywheel 4 by a second strap plate (not illustrated in the figures).

The second abrasion tracking mechanism 8B is a mechanism for reducing variation in a load characteristic of the second clutch C2 attributed to abrasion of a second friction portion 67 (to be described). The second abrasion tracking mechanism 8B is attached to the second pressure plate 49. The second abrasion tracking mechanism 8B is configured to detect the abrasion amount of the second friction portion 67 and axially shift a fulcrum position to be pushed by the drive mechanism 7 in accordance with the detected abrasion amount. Accordingly, the fulcrum position is hardly changed even when the second friction portion 67 is abraded. As a result, the load characteristic of the second clutch C2 is kept roughly constant.

First Clutch Disc Assembly 5

The first clutch disc assembly 5 is an assembly for transmitting power from the input rotor 10 to the first input shaft 91. The first clutch disc assembly 5 is coupled to the first input shaft 91 while being unitarily rotatable therewith and axially movable with respect thereto. The first clutch disc assembly 5 includes the first friction portion 57 and a first input member 52.

The first friction portion 57 is disposed axially between the first disc portion 33 and the first pressure plate 39. The first friction portion 57 is provided slidably with the first disc portion 33 and the first pressure plate 39. The first friction portion 57 includes a cushioning plate (not illustrated in the figures). Therefore, when the first friction portion 57 is interposed between the first pressure plate 39 and the first disc portion 33, the cushioning plate is axially compressed and cushioning force acts on the first pressure plate 39 and the first disc portion 33.

The first input member 52 is a member to which power is transmitted from the first friction portion 57. The first input member 52 is coupled to the first friction portion 57. The first input member 52 is coupled to the first input shaft 91.

Second Clutch Disc Assembly 6

The second clutch disc assembly 6 is an assembly for transmitting power from the input rotor 10 to the second input shaft 92. The second clutch disc assembly 6 is coupled to the second input shaft 92 while being unitarily rotatable therewith and axially movable with respect thereto. The second clutch disc assembly 6 includes the second friction portion 67 and a second input member 62.

The second friction portion 67 is disposed axially between the second disc portion 43 and the second pressure plate 49. The second friction portion 67 is provided slidably with the input rotor 10 and the second pressure plate 49. The second friction portion 67 includes a cushioning plate (not illustrated in the figures). Therefore, when the second friction portion 67 is interposed between the second pressure plate 49 and the second disc portion 43, the cushioning plate is axially compressed and cushion force acts on the second pressure plate 49 and the second disc portion 43.

The second input member 62 is a member to which power is transmitted from the second friction portion 67. The second input member 62 is coupled to the second friction portion 67. The second input member 62 is coupled to the second input shaft 92.

Drive Mechanism 7

The drive mechanism 7 is a mechanism for manipulating transmission of the power of the first clutch C1 and the second clutch C2. The drive mechanism 7 is configured to transmit axial pressing force to the first pressure plate assembly 37 and the second pressure plate assembly 47. The first clutch C1 and the second clutch C2 share the single drive mechanism 7. Specifically, the drive mechanism 7 includes a diaphragm spring 70, an assist spring 75, a first intermediate plate 71, a second intermediate plate 72 and a plurality of intermediate springs 73.

Only one diaphragm spring 70 (an exemplary lever member) is provided for the clutch device 1. The diaphragm spring 70 is a member shared by the first clutch C1 and the second clutch C2. The diaphragm spring 70 is disposed in a preliminarily compressed state for applying elastic force to the first clutch C1. Specifically, the diaphragm spring 70 is supported by the second flywheel 4 while being elastically deformable. The diaphragm spring 70 applies axial pressing force to the first pressure plate 39 through the drive mechanism 7 (to be described). A plurality of support members 45 are fixed to the second flywheel 4. Two wire rings 46 are attached to the plural support members 45. The diaphragm spring 70 is supported by the support members 45 through the two wire rings 46 while being elastically deformable.

While driving force is not being applied to the diaphragm spring 70, the first clutch disc assembly 5 is interposed between the first disc portion 33 and the first pressure plate 39 by the pressing force of the diaphragm spring 70. In other words, the first clutch C1 is of a normal close type.

The assist spring 75 is provided for reducing driving force in switching the second clutch C2 into the engaged state. The assist spring 75 assists pressing force (second pressing force) to be transmitted to the second clutch C2 through the diaphragm spring 70. Specifically, the assist spring 75 is a cone spring and is disposed on the transmission side of the diaphragm spring 70. The assist spring 75 is supported by the support members 45 fixed to the second flywheel 4 while being elastically deformable. The assist spring 75 applies engine-directional assist force to the inner peripheral part of the diaphragm spring 70. In more detail, the inner peripheral part of the assist spring 75 is supported by a release bearing 95. Accordingly, driving force to be applied to the diaphragm spring 70 can be reduced.

The first intermediate plate 71 is a member for transmitting pressing force (the elastic force of the diaphragm spring 70) from the diaphragm spring 70 to the first pressure plate assembly 37. The first intermediate plate 71 is disposed while being unitarily rotatable with and axially rotatable with respect to the input rotor 10, the first pressure plate assembly 37 and the second pressure plate assembly 47. While pressing force is being applied to the first clutch C1 from the diaphragm spring 70 through the first intermediate plate 71, a part of the second intermediate plate 72 is interposed between the first intermediate plate 71 and the first pressure plate assembly 37. In more detail, the first intermediate plate 71 is pressed towards the engine by the diaphragm spring 70 while driving force is not being applied to the diaphragm spring 70. At this time, a part of the second intermediate plate 72 is interposed axially between the first intermediate plate 71 and the first abrasion tracking mechanism 8A. Therefore, the pressing force of the diaphragm spring 70 is transmitted to the first pressure plate assembly 37 through the first intermediate plate 71 and the second intermediate plate 72.

The second intermediate plate 72 is a member for transmitting pressing force (the driving force of an actuator 90) from the diaphragm spring 70 to the second pressure plate assembly 47. The second intermediate plate 72 is disposed while being unitarily rotatable with and axially movable with respect to the input rotor 10, the first pressure plate assembly 37 and the second pressure plate assembly 47. While pressing force is being applied to the second clutch C2 from the actuator 90 through the diaphragm spring 70 and the second intermediate plate 72, a part of the first intermediate plate 71 is interposed between the second intermediate plate 72 and the second pressure plate assembly 47. In more detail, when driving force is transmitted to the diaphragm spring 70 from the actuator 90 through the release bearing 95, the driving force is transmitted to the second pressure plate assembly 47 through the diaphragm spring 70 and the second intermediate plate 72. At this time, a part of the first intermediate plate 71 is interposed between the second intermediate plate 72 and the second abrasion tracking mechanism 8B. Therefore, the pressing force of the diaphragm spring 70 is transmitted to the second pressure plate assembly 47 through the second intermediate plate 72 and the first intermediate plate 71. It should be noted that, in a state illustrated in FIG. 2, a clearance A is produced between the first intermediate plate 71 and the second intermediate plate 72. The clearance A corresponds to the extended/contracted amount of the intermediate springs 73. Further, as illustrated in FIG. 1, the clearance A is set to be roughly the same as an axial clearance between the outer peripheral part of the diaphragm spring 70 and the second intermediate plate 72.

The intermediate springs 73 apply elastic force F2 (coupling maintaining force) to the first clutch C1 and the second clutch C2 so that the minimally power transmitted state of the first clutch C1 and that of the second clutch C2 are maintained while the first clutch C1 and the second clutch C2 are switched using the diaphragm spring 70 (while pressing force F11 is not being applied to the first clutch C1 and the second clutch C2). Specifically, the intermediate springs 73 are disposed between the first intermediate plate 71 and the second intermediate plate 72 while being preliminarily compressed. In the present exemplary embodiment, the elastic force F2 of the intermediate springs 73 is set to have a magnitude whereby a transmission power in the first clutch C1 and that in the second clutch C2 can be roughly equal to a creep power.

Here, the minimally power transmitted state refers to a state that a minimum power whereby a driver does not feel torque transmission prevention is being transmitted. Examples of the minimum power include a creep power to make a vehicle travel at a slow speed without pressing down of an accelerator pedal. These definitions are similarly effective in the following explanation.

The intermediate springs 73 press the first intermediate plate 71 towards the transmission. The intermediate springs 73 press the second intermediate plate 72 towards the engine. The intermediate springs 73 are disposed at intervals in the circumferential direction. The intermediate springs 73 are supported by the first intermediate plate 71 and the second intermediate plate 72 while being elastically deformable.

Load Characteristic

Now, the load characteristic of the clutch device 1 will be explained.

Figure 4:
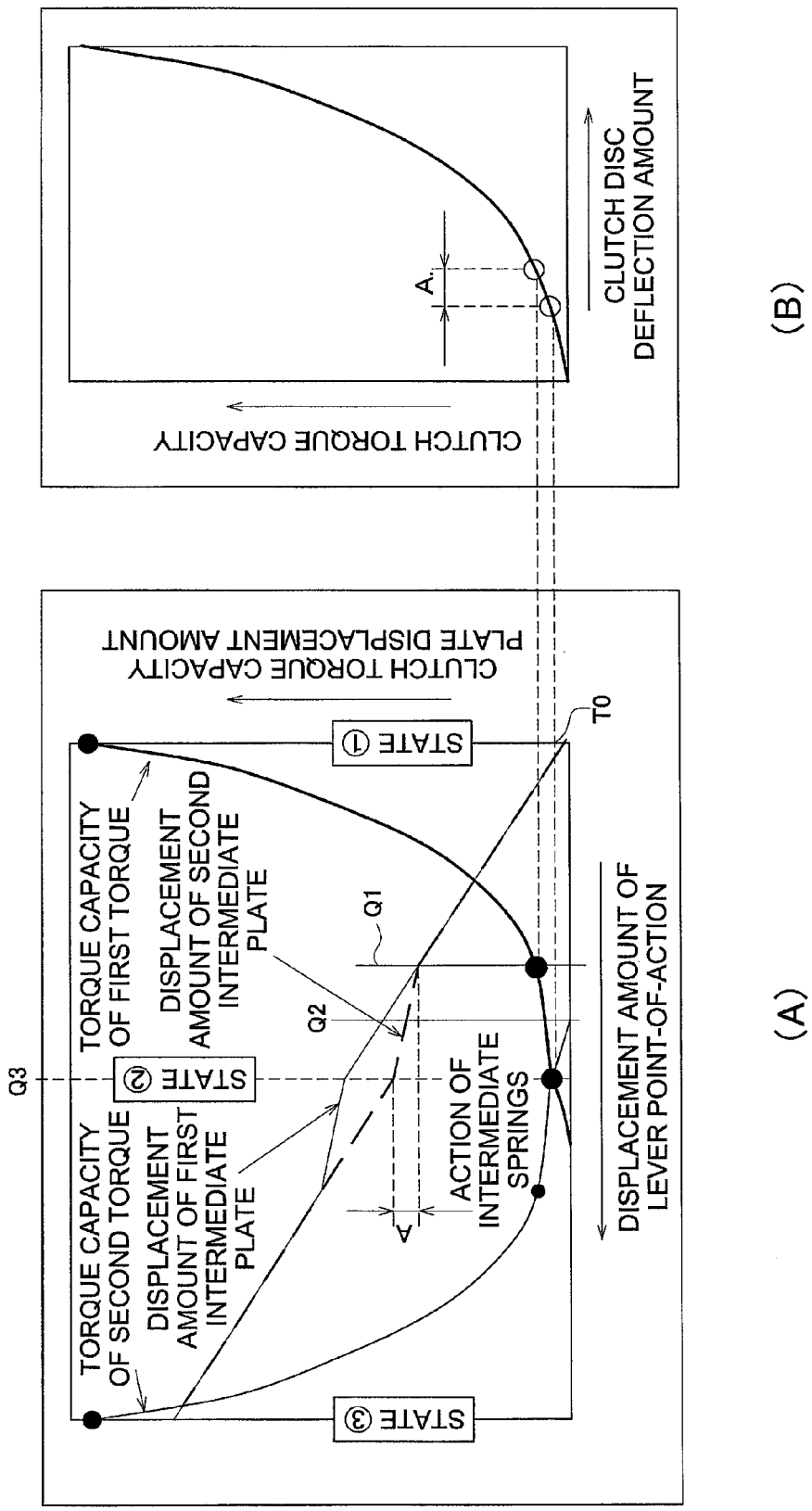
FIG. 4 includes: a diagram (A) representing an action of an intermediate spring; and a diagram (B) representing characteristics of first and second clutch disc assemblies.

In a chart represented in FIG. 4(A), a horizontal axis represents the axial displacement of a point-of-action P1 of the diaphragm spring 70; a first vertical axis represents the torque capacity of the first clutch C1 and that of the second clutch C2; and further, a second vertical axis represents the displacement of the first intermediate plate 71 and that of the second intermediate plate 72. Further, in a chart illustrated in FIG. 4(B), a horizontal axis represents the deflection amount of the first friction portion 57 of the first clutch disc assembly 5, whereas a vertical axis represents the torque capacity of the first clutch C1.

In the clutch device 1 illustrated in FIG. 1, the first clutch C1 is set in an engaged state while the second clutch C2 is set in a release state. Here, the engaged state of a clutch means a state that a required power can be transmitted to the transmission from the engine through the clutch, whereas the release state of a clutch means a state that the required power cannot be transmitted to the transmission from the engine through the clutch. In the clutch device 1 illustrated in FIG. 3, the first clutch C1 is set in the release state while the second clutch C2 is set in the engaged state. The right end of the horizontal axis in FIG. 4(A) corresponds to the state illustrated in FIG. 1, whereas the left end of the horizontal axis in FIG. 4(A) corresponds to the state illustrated in FIG. 3.

While driving force is not being applied to the release bearing 95, the clutch device 1 is set in the state illustrated in FIG. 1. Specifically, the first clutch C1 is set in the engaged state while the second clutch C2 is set in the release state. Under the condition, the first pressure plate assembly 37 is pressed towards the engine by the elastic force of the diaphragm spring 70.

Driving force is transmitted to the diaphragm spring 70 from the actuator 90 through the release bearing 95 when the first clutch C1 is switched into the release state from the engaged state while the second clutch C2 is switched into the engaged state from the release state. When the inner peripheral part of the diaphragm spring 70 is pressed towards the engine, the first clutch C1 is switched into the release state from the engaged state, and subsequently, the second clutch is switched into the engaged state from the release state.

Specifically, when the inner peripheral part of the diaphragm spring 70 is gradually pressed towards the engine by the release bearing 95, the diaphragm spring 70 is elastically deformed at a part supported by the wire rings 46 as a fulcrum and the outer peripheral part of the diaphragm spring 70 (the point-of-action P1) is gradually moved towards the transmission. As a result, the pressing force F11, applied to the first pressure plate assembly 37 from the diaphragm spring 70, is gradually reduced. At this time, the deflection amount of the first friction portion 57 is gradually reduced, and the first intermediate plate 71 and the second intermediate plate 72 are moved towards the transmission together with the point-of-action P1 while being pressed by a cushion force F31 of the first friction portion 57.

When the first pressure plate assembly 37 reaches a position that the cushion force F31 is balanced with the elastic force F2 of the intermediate springs 73, the intermediate springs 73 are gradually extending thereafter so that the cushion force F31 and the elastic force F2 are balanced. At this time, the second intermediate plate 72 is pressed onto the first abrasion tracking mechanism 8A while the first intermediate plate 71 is pressed onto the outer peripheral part of the diaphragm spring 70. In other words, difference begins to be produced between the displacement of the first intermediate plate 71 and that of the second intermediate plate 72. In the course of time, the second flywheel 4 begins to be pressed towards the transmission by the first intermediate plate 71, while the second friction portion 67 is interposed between the second pressure plate assembly 47 and the second flywheel 4. When the elastic force F2 of the intermediate springs 73, the cushion force F31 of the first friction portion 57 and a cushion force F32 of the second friction portion 67 become balanced, the pressing force F11 of the diaphragm spring 70 becomes zero, but the engaged state of the first clutch C1 and that of the second clutch C2 are respectively maintained by the elastic force F2 (FIG. 2). Therefore, torque transmission prevention is not caused even when the pressing force F11 of the diaphragm spring 70 becomes zero.

When the inner peripheral part of the diaphragm spring 70 is further pressed towards the engine by the release bearing 95 from the state illustrated in FIG. 2, the second clutch C2 is, in turn, transitioned to the engaged state. Specifically, the second intermediate plate 72 is pressed towards the transmission by the diaphragm spring 70 and is thereby moved towards the transmission. At this time, when the intermediate springs 73 are gradually compressed and the second intermediate plate 72 axially makes contact with the first intermediate plate 71, the first intermediate, plate 71, the second intermediate plate 72 and the second pressure plate assembly 47 are moved towards the transmission. As a result, the second friction portion 67 is interposed between the second pressure plate assembly 47 and the second flywheel 4 and the second clutch C2 is set in the engaged state (FIG. 3).

Figure 5:
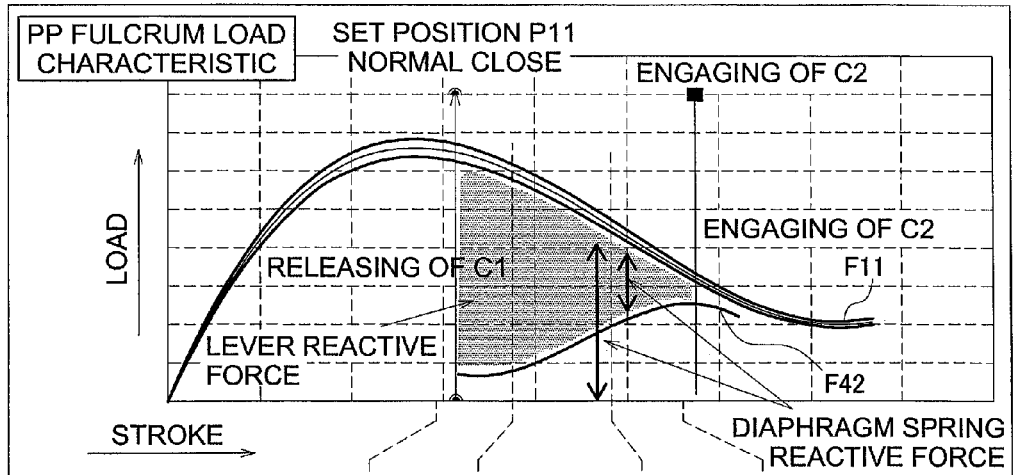
FIG. 5 includes: a load characteristic diagram (A) (based on a load point-of-action of a first pressure plate) and a load characteristic diagram (based on a release bearing).
Figure 5:
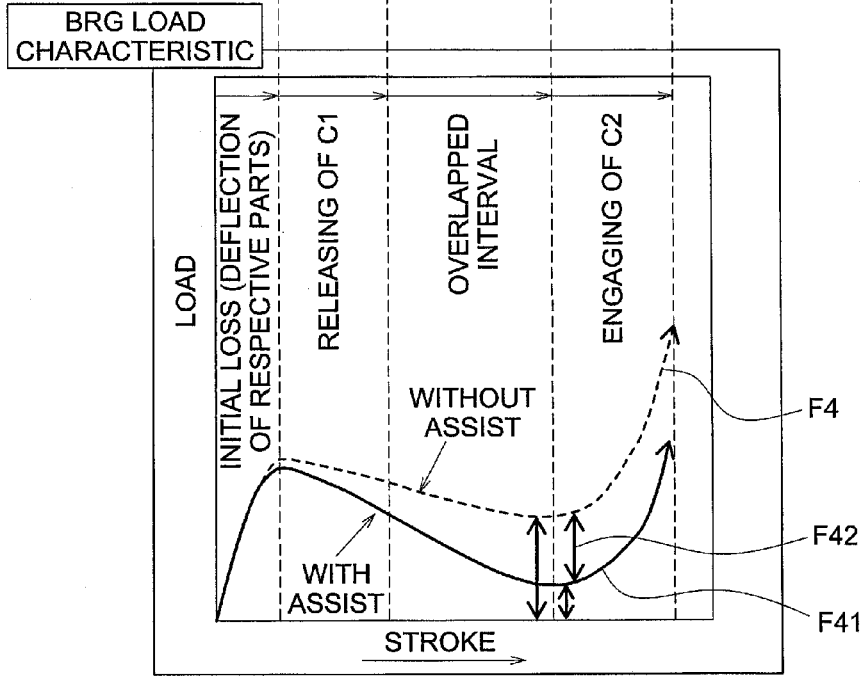

Now, the action of the assist spring 75 will be explained using FIGS. 5(A) and 5(B). FIG. 5(A) represents a pressure load characteristic at the point-of-action P1 of the diaphragm spring 70. FIG. 5(B) represents a lever driving force characteristic in the release bearing 95.

As represented in FIG. 5(A), a set position P11 of the diaphragm spring 70 corresponds to the position of the diaphragm spring 70 where the first clutch C1 is set in the engaged state. In consideration of reduction in lever driving force, the set position P11 is set to be a position in which the pressing load of the diaphragm spring 70 is gradually reduced in clutch releasing.

However, in coupling the second clutch C2, pressing force is required to be transmitted to the second clutch C2 through the diaphragm spring 70 in addition to the force of elastically deforming the diaphragm spring 70. As represented in FIG. 5(B), in such case, a clutch driving force F4 to be transmitted to the diaphragm spring 70 from the actuator 90 is acutely increased and the load of the actuator 90 is inevitably increased, where the second clutch C2 is set in the engaged state.

To cope with the above, in the clutch device 1, the load of the actuator 90 is reduced by the assist spring 75. The assist spring 75 presses the release bearing 95 towards the engine. In other words, the release bearing 95 is pressed towards the engine by an assist force F42 of the assist spring 75. Therefore, a part of the clutch driving force F4 can be compensated by the assist force F42. As represented in FIG. 5(B), a lever driving force F41 can be thereby entirely reduced compared to a structure without the assist spring 75.

Further, as represented in FIG. 5(A), the assist force F42 of the assist spring 75, which acts on the release bearing 95, is set to have a load characteristic configured to be maximized in the vicinity of the engaged state of the second clutch C2. Therefore, it is possible to effectively reduce the lever driving force F41 in the coupling action of the second clutch C2 in which a required pressing force is acutely increased.

Action of Clutch Device 1

As illustrated in FIG. 1, while driving force is not acting on the diaphragm spring 70 from the actuator 90, the elastic force of the diaphragm spring 70 is transmitted to the first pressure plate assembly 37 through the first intermediate plate 71 and the second intermediate plate 72. As a result, power is transmitted to the transmission from the engine through the first clutch C1.

When a power transmission line is switched from the first clutch C1 to the second clutch C2, the first clutch C1 and the second clutch C2 are driven by the shared diaphragm spring 70. Specifically, when driving force is inputted into the inner peripheral part of the diaphragm spring 70 from the release bearing 95 while the first clutch C1 is set in the engaged stage, the inner peripheral part of the diaphragm spring 70 is moved towards the engine, and accordingly, the outer peripheral part of the diaphragm spring 70 (the point-of-action P1) is moved towards the transmission. As a result, the elastic force, which is being transmitted to the first pressure plate assembly 37, is gradually reduced and the transmission power in the first clutch C1 is gradually reduced.

When the point-of-action P1 of the diaphragm spring 70 is moved towards the transmission, the first intermediate plate 71, the second intermediate plate 72 and the intermediate springs 73 are also moved towards the transmission. At this time, as represented in FIG. 4(A), the first intermediate plate 71 and the second intermediate plate 72 are unitarily moved towards the transmission while axially making contact with each other until the cushion force F31 of the first friction portion 57 becomes equal to the elastic force F2 of the intermediate springs 73. When the cushion force F31 becomes equal to the elastic force F2, the intermediate springs 73 are gradually extending in proportion to reduction in the cushion force F31. Accordingly, the first intermediate plate 71 is gradually separated away from the second intermediate plate 72 by the intermediate springs 73 (a position Q1 in FIG. 4(A)). At this time, the elastic force F2 of the intermediate springs 73 is gradually reduced and the torque capacity of the first clutch C1 is also gradually reduced. At this time, the second intermediate plate 72 is axially moved while being pressed onto the first abrasion tracking mechanism 8A. On the other hand, the first intermediate plate 71 is axially moved while being pressed onto the diaphragm spring 70.

When the first intermediate plate 71 is moved towards the transmission, the first intermediate plate 71 makes contact with the second abrasion tracking mechanism 8B, and the second pressure plate assembly 47 is pressed towards the transmission by the first intermediate plate 71 (a position Q2 in FIG. 4(A)). As a result, the torque capacity of the second clutch C2 is gradually increased and the cushion force F32 of the second friction portion 67 is also gradually increased.

In the course of time, when the elastic force F2 of the intermediate springs 73 becomes equal to the cushion force F31 of the first friction portion 57 and the cushion force F32 of the second friction portion 67, the second pressure plate assembly 47 is stopped moving and the first intermediate plate 71 is separated away from the outer peripheral part of the diaphragm spring 70. As a result, the pressing force F11, acting on the point-of-action P1 from the diaphragm spring 70, becomes zero and the cushion force F31 of the first friction portion 57, the cushion force F32 of the second friction portion 67 and the elastic force F2 of the intermediate springs 73 are balanced (a position Q3 in FIG. 4(A), the state illustrated in FIG. 2). At this time, the engaged state of the first clutch C1 and that of the second clutch C2 are slightly maintained by the elastic force F2 of the intermediate springs 73. At this time, a transmission power T0 in the first clutch C1 and that in the second clutch C2 are respectively roughly equal to a creep power.

When the inner peripheral part of the diaphragm spring 70 is further pressed towards the engine, the second intermediate plate 72 begins to be pressed towards the transmission by the outer peripheral part of the diaphragm spring 70. As a result, the second friction portion 67 of the second clutch disc assembly 6 is interposed between the second pressure plate 49 and the second disc portion 43, and the transmission power in the second clutch C2 is increased. When the release bearing 95 is driven to a predetermined position, a pressing force F12, which is transmitted to the second pressure plate assembly 47 through the diaphragm spring 70, is increased and the second clutch C2 is set in the engaged state. Accordingly, power is transmitted to the second input shaft 92 through the second clutch C2.

In coupling the second clutch C2, the assist force F42 of the assist spring 75 is acting on the release bearing 95. Therefore, as represented in FIG. 5(B), the lever driving force F41 of the actuator 90 to be applied to the release bearing 95 is reduced in switching the second clutch C2 into the engaged state.

Characteristic 1 of Clutch Device 1

As explained above, in the present clutch device 1, the elastic force F2 (coupling maintaining force) is applied to the first clutch C1 and the second clutch C2 by the intermediate springs 73 so that the first clutch C1 and the second clutch C2 can be maintained in the minimally power transmitted state while the first clutch C1 and the second clutch C2 are switched using the diaphragm spring 70 (when the pressing force F11 is not being applied to the first clutch C1 and the second clutch C2). Therefore, occurrence of torque transmission prevention can be prevented even when the first clutch C1 and the second clutch C2 are switched using the single diaphragm spring 70.

Further, the first clutch C1 and the second clutch C2 are driven by the single diaphragm spring 70. Therefore, it is required to provide only one actuator 90. Accordingly, reduction in size of the clutch device 1 can be achieved.

Based on the above, according to the present clutch device 1, torque transmission prevention can be prevented while reduction in size of the device can be achieved.

Characteristic 2 of Clutch Device 1

Further, in the present clutch device 1, the input rotor 10 is restricted from axially moving towards the engine by the first input shaft 91 and the second input shaft 92. Therefore, even when axial clutch driving force is inputted into the diaphragm spring 70 for setting the second clutch C2 in the engaged state, the first input shaft 91 and the second input shaft 92 can receive the clutch driving force. Accordingly, the clutch driving force can be prevented from being transmitted to the engine.

Further, pressing force is transmitted to the first pressure plate 39 and the second pressure plate 49 through the single diaphragm spring 70. Therefore, it is required to provide only one actuator 90. Accordingly, reduction in size of the device can be achieved.

Therefore, according to the present clutch device 1, the clutch driving force can be prevented from being transmitted to the engine, while reduction in size of the device can be achieved.

Further, the elastic force F2 (coupling maintaining force) is applied to the first clutch C1 and the second clutch C2 by the intermediate springs 73 so that the first clutch C1 and that of the second clutch C2 can be maintained in the minimally power transmitted state while the first clutch C1 and the second clutch C2 are switched using the diaphragm spring 70 (when the pressing force F11 is not being applied to the first clutch C1 and the second clutch C2). Therefore, torque transmission prevention can be prevented even when the first clutch C1 and the second clutch C2 are switched using the single diaphragm spring 70.

Second Exemplary Embodiment

In the aforementioned first exemplary embodiment, the first clutch C1 is of a normal close type, while the second clutch C2 is of a normal open type. However, the first clutch C1 can be of a normal open type, while the second clutch C2 can be of a normal close type.

It should be noted that in the following explanation, the same reference signs are assigned to elements having substantially the same functions as those in the aforementioned exemplary embodiment and detailed explanation thereof will be hereinafter omitted.

Figure 6:
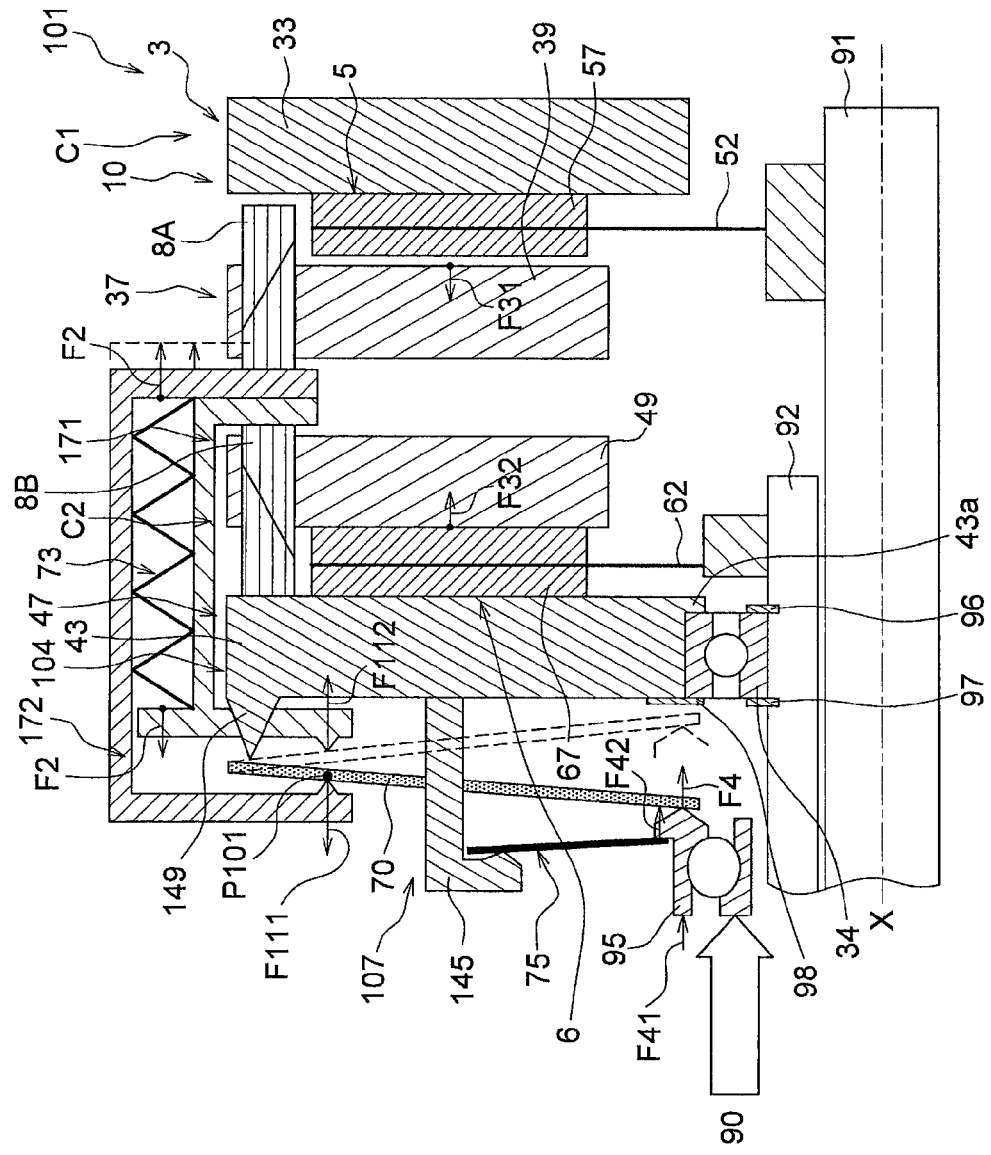
FIG. 6 is a cross-sectional view of a clutch device (a second exemplary embodiment).

As illustrated in FIG. 6, a clutch device 101 according to a second exemplary embodiment includes the input rotor 10, the first pressure plate assembly 37, the second pressure plate assembly 47, the first clutch disc assembly 5, the second clutch disc assembly 6, the first abrasion tracking mechanism 8A, the second abrasion tracking mechanism 8B and a drive mechanism 107. The first clutch C1 is formed by the input rotor 10, the first pressure plate assembly 37, the first clutch disc assembly 5 and the drive mechanism 107. The second clutch C2 is formed by the input rotor 10, the second pressure plate assembly 47, the second clutch disc assembly 6 and the drive mechanism 107. In other words, the first clutch C1 and the second clutch C2 share the drive mechanism 107.

It should be noted that, in FIG. 6, the engine is disposed on the right side of the clutch device 101, whereas the transmission is disposed on the left side of the clutch device 101, although not illustrated in the figure. Therefore, in FIG. 6, the engine side refers to the right side, whereas the transmission side refers to the left side.

Input Rotor 10

The input rotor 10 is a member to which power is transmitted from the engine. The input rotor 10 is coupled to the crankshaft (not illustrated in the figure) through the flexible plate (not illustrated in the figure) and the damper (not illustrated in the figure). The input rotor 10 is rotated about the rotary axis X. The input rotor 10 mainly includes the first flywheel 3 and the second flywheel 104.

(1) First Flywheel 3

The first flywheel 3 has the first disc portion 33 having an annular shape. The first flywheel 3 is fixed to and unitarily rotated with the second flywheel 104.

(2) Second Flywheel 104

The second flywheel 104 is fixed to and unitarily rotated with the first flywheel 3. The second flywheel 104 is rotatably supported by the second input shaft 92 through the bearing 34. The bearing 34 is fixed to the inner peripheral part of the second flywheel 104. The bearing 34 also supports the first flywheel 3 in a rotatable state through the second flywheel 104. The bearing 34 is restricted from moving towards the engine by the snap ring 96 attached to the second input shaft 92. Further, the bearing 34 is restricted from moving towards the transmission by a snap ring 97 attached to the second input shaft 92. Yet further, the bearing 34 axially makes contact with a restricting portion 43a of the second flywheel 104, while being interposed between the restricting portion 43a and a plate 98 fixed to the second disc portion 43. Therefore, the bearing 34 is integrally fixed to the second flywheel 104 in the axial direction. Accordingly, the input rotor 10 is restricted from moving towards the engine and the transmission with respect to the second input shaft 92. The bearing 34, the snap ring 96 and the snap ring 97 receive driving force in switching the second clutch C2 into the engaged state.

Drive Mechanism 107

The drive mechanism 107 is a mechanism for manipulating transmission of power of the first clutch C1 and the second clutch C2. The drive mechanism 107 is configured to transmit axial pressing force to the first pressure plate assembly 37 and the second pressure plate assembly 47. Specifically, the drive mechanism 107 includes the diaphragm spring 70, the assist spring 75, an intermediate plate 171, a second intermediate plate 172 and the plural intermediate springs 73.

Only one diaphragm spring 70 (an exemplary lever member) is provided for the clutch device 1. The diaphragm spring 70 is a member shared by the first clutch C1 and the second clutch C2. The diaphragm spring 70 is disposed in a preliminarily compressed state for applying elastic force to the second clutch C2. The diaphragm spring 70 is supported by the second flywheel 104 while being elastically deformable. Specifically, the second flywheel 104 has a plurality of support protrusions 149 axially protruding from the second disc portion 43. The outer peripheral part of the diaphragm spring 70 is axially supported by the support protrusions 149. The diaphragm spring 70 makes contact with the second intermediate plate 172 at a point-of-action P101. The diaphragm spring 70 has been preliminarily compressed between the second flywheel 104 and the second intermediate plate 172. Therefore, the diaphragm spring 70 applies axial pressing force to the second pressure plate 49 through the second intermediate plate 172. Further, a plurality of support members 145 are fixed to the second flywheel 104. The plural support members 145 support the outer peripheral part of the assist spring 75.

While driving force is not being applied to the diaphragm spring 70, the second clutch disc assembly 6 is interposed between the second disc portion 43 and the second pressure plate 49 by pressing force of the diaphragm spring 70. In other words, the second clutch C2 is of a normal close type.

The first intermediate plate 171 is a member for transmitting pressing force (the driving force of the actuator 90) from the diaphragm spring 70 to the first pressure plate assembly 37. The first intermediate plate 171 is disposed while being unitarily rotatable with and axially movable with respect to the input rotor 10, the first pressure plate assembly 37 and the second pressure plate assembly 47. While pressing force is being applied to the first clutch C1 from the actuator 90 through the diaphragm spring 70 and the first intermediate plate 171, a part of the second intermediate plate 172 is interposed between the first intermediate plate 171 and the first pressure plate assembly 37. In more detail, when driving force is transmitted to the diaphragm spring 70 from the actuator 90 through the release bearing 95, the driving force is transmitted to the first pressure plate assembly 37 through the diaphragm spring 70 and the first intermediate plate 171. At this time, a part of the second intermediate plate 172 is interposed between the first intermediate plate 171 and the first abrasion tracking mechanism 8A. Thus, the driving force of the actuator 90 is transmitted to the first pressure plate assembly 37 through the diaphragm spring 70, the first intermediate plate 171 and the second intermediate plate 172.

The second intermediate plate 172 is a member for transmitting pressing force (the elastic force of the diaphragm spring 70) from the diaphragm spring 70 to the second pressure plate assembly 47. The second intermediate plate 172 is disposed while being unitarily rotatable with and axially movable with respect to the input rotor 10, the first pressure plate assembly 37 and the second pressure plate assembly 47. While pressing force is being applied to the second clutch C2 from the diaphragm spring 70 through the second intermediate plate 172, a part of the first intermediate plate 171 is interposed between the second intermediate plate 172 and the second pressure plate assembly 47. In more detail, while driving force is not being applied to the diaphragm spring 70, the second intermediate plate 172 is pressed towards the transmission by the diaphragm spring 70. At this time, a part of the first intermediate plate 171 is interposed axially between the second intermediate plate 172 and the second abrasion tracking mechanism 8B. Therefore, the pressing force of the diaphragm spring 70 is transmitted to the second pressure plate assembly 47 through the first intermediate plate 171 and the second intermediate plate 172.

The intermediate springs 73 apply the elastic force F2 to the first clutch C1 and the second clutch C2 so that the minimally power transmitted state of the first clutch C1 and that of the second clutch C2 are maintained while the first clutch C1 and the second clutch C2 are switched using the diaphragm spring 70 (while the pressing force F11 is not being applied to the first clutch C1 and the second clutch C2). Specifically, the intermediate springs 73 are disposed between the first intermediate plate 171 and the second intermediate plate 172 while being preliminarily compressed. In the present exemplary embodiment, the elastic force F2 of the intermediate springs 73 is set to have a magnitude whereby transmission power in the first clutch C1 and that in the second clutch C2 can be roughly equal to creep power.

The intermediate springs 73 press the first intermediate plate 171 towards the transmission. The intermediate springs 73 press the second intermediate plate 172 towards the engine. The intermediate springs 73 are disposed at intervals in the circumferential direction. The intermediate springs 73 are supported by the first intermediate plate 171 and the second intermediate plate 172 while being elastically deformable.

Action of Clutch Device 1

As illustrated in FIG. 6, while driving force is not acting on the diaphragm spring 70 from the actuator 90, the elastic force of the diaphragm spring 70 is transmitted to the second pressure plate 49 through the second intermediate plate 172, the first intermediate plate 171 and the second abrasion tracking mechanism 8B. As a result, power is transmitted to the transmission from the engine through the second clutch C2.

When the power transmission line is switched from the second clutch C2 to the first clutch C1, decoupling of the second clutch C2 and coupling of the first clutch C1 are executed through the shared diaphragm spring 70. Specifically, driving force is inputted into the inner peripheral part of the diaphragm spring 70 from the release bearing 95 while the second clutch C2 is set in the engaged state. As a result, the inner peripheral part of the diaphragm spring 70 is moved towards the engine, and accordingly, the point-of-action P101 of the diaphragm spring 70 is moved towards the transmission. As a result, the elastic force, which is being transmitted to the second pressure plate 49, is gradually reduced and the transmission power in the second clutch C2 is gradually reduced.

When the point-of-action P101 of the diaphragm spring 70 is moved towards the engine, the first intermediate plate 171, the second intermediate plate 172 and the intermediate springs 73 are also moved towards the engine. At this time, the first intermediate plate 171 and the second intermediate plate 172 are unitarily moved towards the engine while axially making contact with each other until the cushion force F32 of the second friction portion 67 becomes equal to the elastic force F2 of the intermediate springs 73. When the cushion force F32 becomes equal to the elastic force F2, the intermediate springs 73 are gradually extending while the first intermediate plate 171 is gradually separated away from the second intermediate plate 172. At this time, the first intermediate plate 171 is axially moved while being pressed onto the second abrasion tracking mechanism 8B. The second intermediate plate 172 is axially moved while being pressed onto the diaphragm spring 70.

When the first intermediate plate 171 is moved towards the transmission, the first intermediate plate 171 makes contact with the second abrasion tracking mechanism 8B, and the second pressure plate assembly 47 is pressed towards the transmission by the first intermediate plate 171. As a result, the torque capacity of the second clutch C2 gradually increased and the cushion force F32 of the second friction portion 67 is also gradually increased.

In the course of time, when the elastic force F2 of the intermediate springs 73 becomes equal to the cushion force F31 of the first friction portion 57 and the cushion force F32 of the second friction portion 67, the second pressure plate assembly 47 is stopped moving and the first intermediate plate 171 is separated away from the outer peripheral part of the diaphragm spring 70. As a result, a pressing force F111, acting on the point-of-action P1 from the diaphragm spring 70, becomes zero and the cushion force F31 of the first friction portion 57, the cushion force F32 of the second friction portion 67 and the elastic force F2 of the intermediate springs 73 are balanced. At this time, the engaged state of the first clutch C1 and that of the second clutch C2 are slightly maintained by the elastic force F2 of the intermediate springs 73. At this time, the transmission power in the clutch C1 and that in the second clutch C2 are roughly equal to creep power.

When the inner peripheral part of the diaphragm spring 70 is further pressed towards the engine, the first intermediate plate 171 begins to be pressed towards the engine by the diaphragm spring 70. As a result, the first friction portion 57 of the first clutch disc assembly 5 is interposed between the first pressure plate 39 and the first disc portion 33, and the transmission power in the first clutch is increased. When the release bearing 95 is driven to a predetermined position, a pressing force F112, which is transmitted to the first pressure plate 39 through the diaphragm spring 70, is increased and the first clutch c1 is set in the engaged state. Accordingly, power is transmitted to the first input shaft 91 through the first clutch C1.

The assist force of the assist spring 75 is acting on the release bearing 95. Therefore, similarly to the first exemplary embodiment, driving force to be applied to the release bearing 95 is reduced in switching the first clutch C1 into the engaged state.

Even with the above-explained clutch device 101, torque transmission prevention cab be prevented while reduction in size of the device can be achieved.

Further, the input rotor 10 is restricted from axially moving towards the engine by the first input shaft 91 and the second input shaft 92. Therefore, even when axial clutch driving force is inputted into the diaphragm spring 70, the first input shaft 91 and the second input shaft 92 can receive the clutch driving force. Accordingly, the clutch driving force can be prevented from being transmitted to the engine.

Further, pressing force is transmitted to the first pressure plate assembly 37 and the second pressure plate assembly 47 through the single diaphragm spring 70. Therefore, it is required to provide only one actuator 90. Accordingly, reduction in size of the device can be achieved.

Therefore, according to the present clutch device 101, the clutch driving force can be prevented from being transmitted to the engine, while reduction in size of the device can be achieved.

Third Exemplary Embodiment

In the aforementioned first and second exemplary embodiments, the normal open type clutch and the normal close type clutch are used in combination. However, each of the first and second clutches can be of a normal open type.

Figure 7:
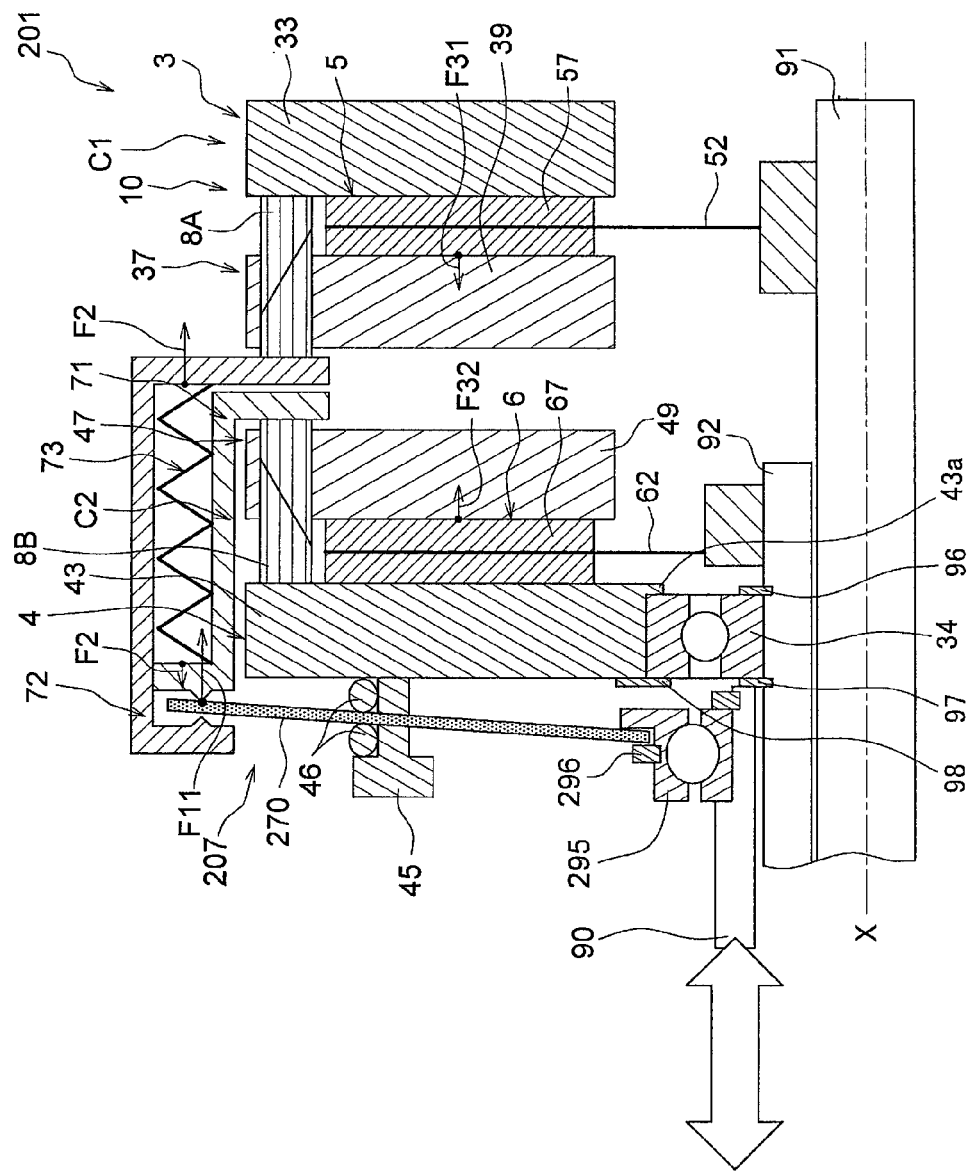
FIG. 7 is a cross-sectional view of a clutch device (a third exemplary embodiment).

For example, as illustrated in FIG. 7, a clutch device 201 according to a third exemplary embodiment includes the input rotor 10, the first pressure plate assembly 37, the second pressure plate assembly 47, the first clutch disc assembly 5, the second clutch disc assembly 6, the first abrasion tracking mechanism 8A, the second abrasion tracking mechanism 8B and a drive mechanism 207. The first clutch C1 is formed by the input rotor 10, the first pressure plate assembly 37 and the first clutch disc assembly 5. The second clutch C2 is formed by the input rotor 10, the second pressure plate assembly 47 and the second clutch disc assembly 6. The first clutch C1 and the second clutch C2 share the drive mechanism 207. The first clutch C1 is a mechanism for transmitting power to the first input shaft 91 and is a clutch of a normal open type. On the other hand, the second clutch C2 is a mechanism for transmitting power to the second input shaft 92 and is a clutch of a normal open type.

It should be noted that in FIG. 7, the engine is disposed on the right side of the clutch device 201, whereas the transmission is disposed on the left side of the clutch device 201, although not illustrated in the figure. Therefore, in FIG. 7, the engine side refers to the right side, whereas the transmission side refers to the left side.

Drive Mechanism 207

The drive mechanism 207 is a mechanism for manipulating transmission of power of the first clutch C1 and the second clutch C2. The drive mechanism 207 is configured to transmit axial pressing force to the first pressure plate assembly 37 and the second pressure plate assembly 47. The first clutch C1 and the second clutch C2 share the single drive mechanism 207. Specifically, the drive mechanism 207 includes a drive lever 270, the first intermediate plate 71, the second intermediate plate 72 and the plural intermediate springs 73.

Only one drive lever 270 (an exemplary lever member) is provided for the clutch device 201. The drive lever 270 is a member shared by the first clutch C1 and the second clutch C2. Unlike the aforementioned first and second exemplary embodiments, the drive lever 270 is a member with low stiffness and thereby cannot generate elastic force enough to press the first clutch C1 and the second clutch C2. However, driving force can be transmitted from the actuator 90 to the first intermediate plate 71 and the second intermediate plate 72. The drive lever 270 is supported by the second flywheel 4 while being elastically deformable. The plural support members 45 are fixed to the second flywheel 4. The two wire rings 46 are attached to the plural support members 45. The drive lever 270 is supported by the support members 45 through the two wire rings 46 while being elastically deformable.

As illustrated in FIG. 7, while driving force is not being applied to the drive lever 270 from the actuator 90, the engaged state of the first clutch C1 and that of the second clutch C2 are slightly maintained by the elastic force F2 of the intermediate springs 73. The inner peripheral part of the drive lever 270 is axially supported by a release bearing 295. A snap ring 296 is attached to the release bearing 295. The inner peripheral part of the drive lever 270 is interposed between the release bearing 295 and the snap ring 296. The actuator 90 is disposed for applying driving force to the drive lever 270 in both axial directions. Driving force can be transmitted to the drive lever 270 from the actuator 90 through the release bearing 295 in the both axial directions (towards the engine and the transmission).

The first intermediate plate 71 is a member for transmitting pressing force (the driving force of the actuator 90) from the drive lever 270 to the first pressure plate assembly 37. The first intermediate plate 71 is disposed while being unitarily rotatable with and axially movable with respect to the input rotor 10, the first pressure plate assembly 37 and the second pressure plate assembly 47. While pressing force is being applied to the first clutch C1 from the actuator 90 through the drive lever 270 and the first intermediate plate 71, a part of the second intermediate plate 72 is interposed between the first intermediate plate 71 and the first pressure plate assembly 37. In more detail, the first intermediate plate 71 is pressed towards the engine by the drive lever 270 while transmission-directional driving force is being applied to the drive lever 270 from the actuator 90 through the release bearing 295. At this time, a part of the second intermediate plate 72 is interposed between the first intermediate plate 71 and the first abrasion tracking mechanism 8A. Therefore, the driving force transmitted to the drive lever 270 is transmitted to the first pressure plate assembly 37 through the first intermediate plate 71 and the second intermediate plate 72.

The second intermediate plate 72 is a member for transmitting pressing force (the driving force of the actuator 90) from the drive lever 270 to the second pressure plate assembly 47. The second intermediate plate 72 is disposed while being unitarily rotatable with and axially movable with respect to the input rotor 10, the first pressure plate assembly 37 and the second pressure plate assembly 47. While pressing force is being applied to the second clutch C2 from the actuator 90 through the drive lever 270 and the second intermediate plate 72, a part of the first intermediate plate 71 is interposed between the second intermediate plate 72 and the second pressure plate assembly 47. In more detail, the second intermediate plate 72 is pressed towards the transmission by the drive lever 270 while engine-directional driving force is being applied to the drive lever 270 from the actuator 90 through the release bearing 95. At this time, a part of the first intermediate plate 71 is interposed between the second intermediate plate 72 and the second abrasion tracking mechanism 8B. Therefore, the driving force transmitted to the drive lever 270 is transmitted to the second pressure plate assembly 47 through the second intermediate plate 72 and the first intermediate plate 71.

The intermediate springs 73 apply the elastic force F2 (coupling maintaining force) to the first clutch C1 and the second clutch C2 so that the minimally power transmitted state of the first clutch C1 and that of the second clutch C2 are maintained while the first clutch C1 and the second clutch C2 are switched using the drive lever 270 (while the pressing force F11 is not being applied to the first clutch C1 and the second clutch C2). Specifically, the intermediate springs 73 are disposed between the first intermediate plate 71 and the second intermediate plate 72 while being preliminarily compressed. In the present exemplary embodiment, the elastic force F2 of the intermediate springs 73 is set to have a magnitude whereby the transmission power in the first clutch C1 and that in the second clutch C2 can be roughly equal to creep power.

The intermediate springs 73 press the first intermediate plate 71 towards the transmission. The intermediate springs 73 press the second intermediate plate 72 towards the engine. The intermediate springs 73 are disposed at intervals in the circumferential direction. The intermediate springs 73 are supported by the first intermediate plate 71 and the second intermediate plate 72 while being elastically deformable.

Action of Clutch Device 201

As illustrated in FIG. 7, while driving force is not acting on the drive lever 270 from the actuator 90, pressing force is not being transmitted to the first pressure plate assembly 37 and the second pressure plate assembly 47 from the drive lever 270.

However, by the elastic force F2 of the intermediate springs 73, the first pressure plate assembly 37 is pressed towards the engine, whereas the second pressure plate assembly 47 is pressed towards the transmission. Specifically, elastic force is being transmitted to the first pressure plate 39 from the intermediate springs 73 through the second intermediate plate 72 and the first abrasion tracking mechanism 8A. On the other hand, elastic force is being transmitted to the second pressure plate 49 from the intermediate springs 73 through the first intermediate plate 71 and the second abrasion tracking mechanism 8B. Therefore, the minimally power transmitted state of the first clutch C1 and that of the second clutch C2 are maintained by the elastic force F2 of the intermediate springs 73 while driving force is not being transmitted to the drive lever 270.

When the transmission-directional driving force is transmitted to the inner peripheral part of the drive lever 270 from the release bearing 295 under the condition illustrated in FIG. 7, the first intermediate plate 71 is pressed towards the engine through the drive lever 270. As a result, the intermediate springs 73 are compressed between the first intermediate plate 71 and the second intermediate plate 72, and the first intermediate plate 71 makes contact with the second intermediate plate 72. When the inner peripheral part of the drive lever 270 is further pressed towards the transmission, the first pressure plate assembly 37 is pressed towards the engine through the first intermediate plate 71 and the second intermediate plate 72. As a result, the first clutch C1 is set in the engaged state.

On the other hand, when the engine-directional driving force is transmitted to the inner peripheral part of the drive lever 270 from the release bearing 295 under the condition illustrated in FIG. 7, the second intermediate plate 72 is pressed towards the transmission through the drive lever 270. As a result, the intermediate springs 73 are compressed between the first intermediate plate 71 and the second intermediate plate 72, and the second pressure plate assembly 47 is pressed towards the transmission by the second intermediate plate 72 through the first intermediate plate 71. As a result, the second clutch C2 is set in the engaged state.

Even with the above-explained clutch device 201, torque transmission prevention can be prevented while reduction in size of the device can be achieved.

Further, the input rotor 10 is restricted from moving in the both axial directions by the first input shaft 91 and the second input shaft 92. Therefore, even when axial clutch driving force is inputted into the diaphragm spring 70, the first input shaft 91 and the second input shaft 92 can receive the clutch driving force. Accordingly, the clutch driving force can be prevented from being transmitted to the engine.

Yet further, pressing force is transmitted to the first pressure plate assembly 37 and the second pressure plate assembly 47 through the single diaphragm spring 70. Therefore, it is required to provide only one actuator 90. Accordingly, reduction in size of the device can be achieved.

Therefore, according to the present clutch device 201, the clutch driving force can be prevented from being transmitted to the engine, while reduction in size of the device can be achieved.

Fourth Exemplary Embodiment

In the aforementioned first exemplary embodiment, the intermediate springs 73 between the first intermediate plate 71 and the second intermediate plate 72 while being preliminarily compressed. However, the intermediate springs 73 can be disposed between the first pressure plate assembly 37 and the second pressure plate assembly 47.

Figure 8:
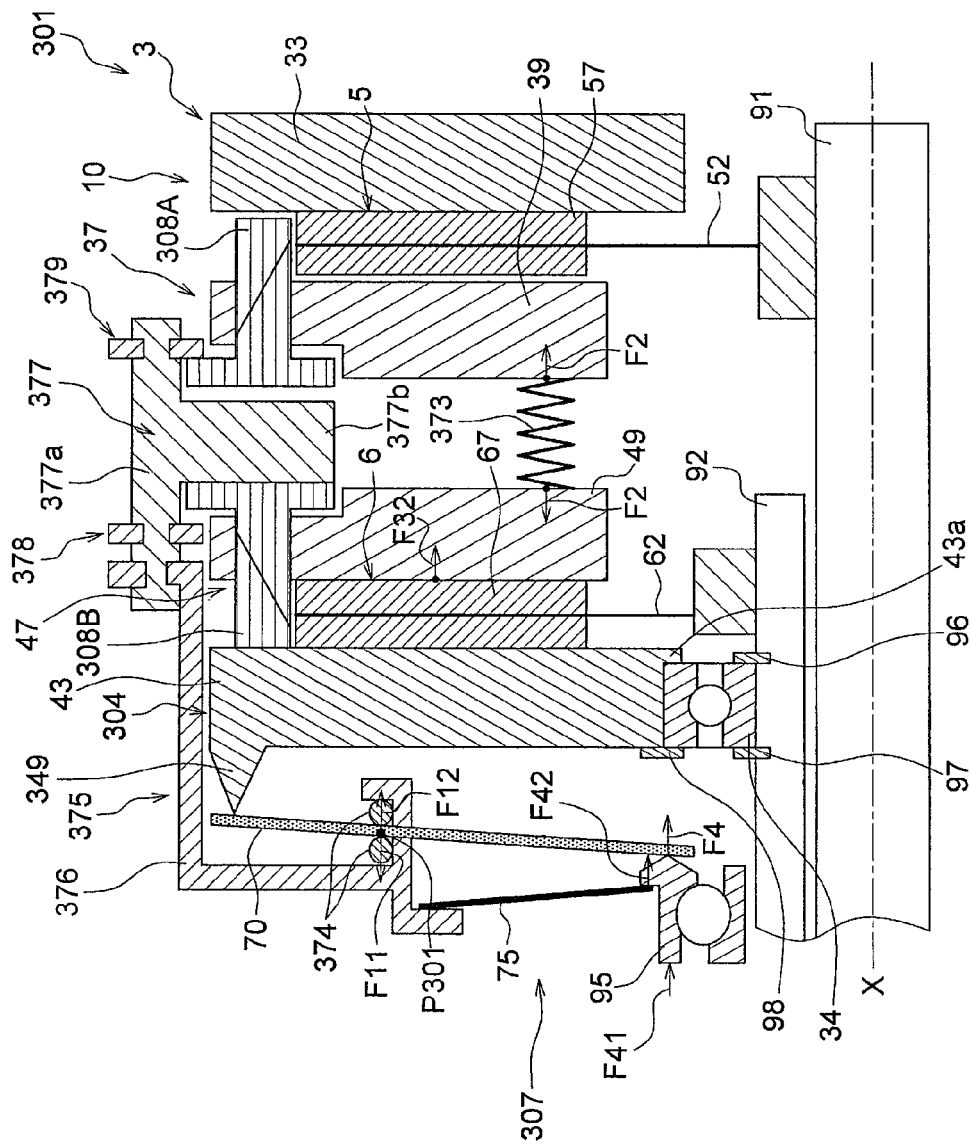
FIG. 8 is a cross-sectional view of a clutch device (a second clutch is set in an engaged state, a fourth exemplary embodiment).
Figure 9:
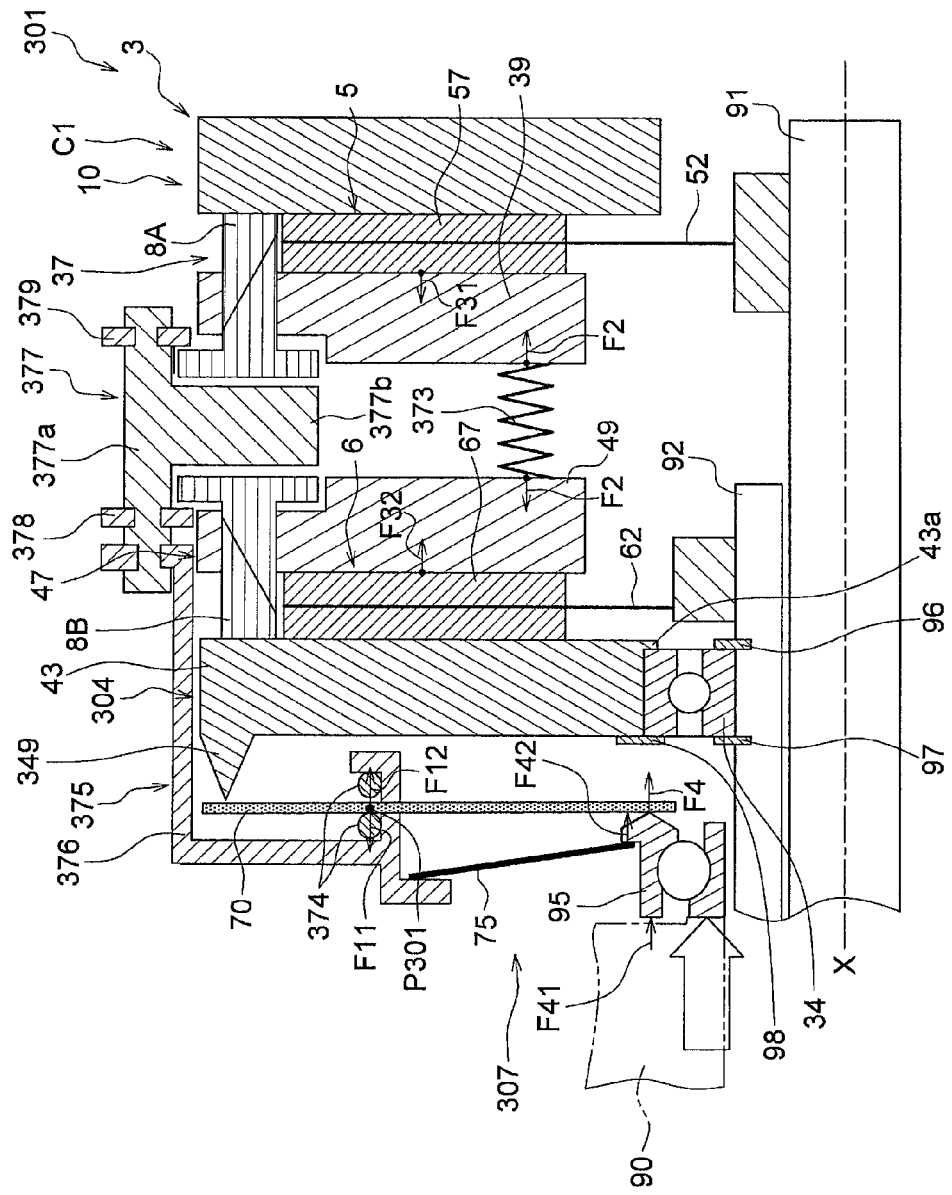
FIG. 9 is a cross-sectional view of the clutch device (a first clutch and the second clutch are both set in an engaged state, the fourth exemplary embodiment).
Figure 10:
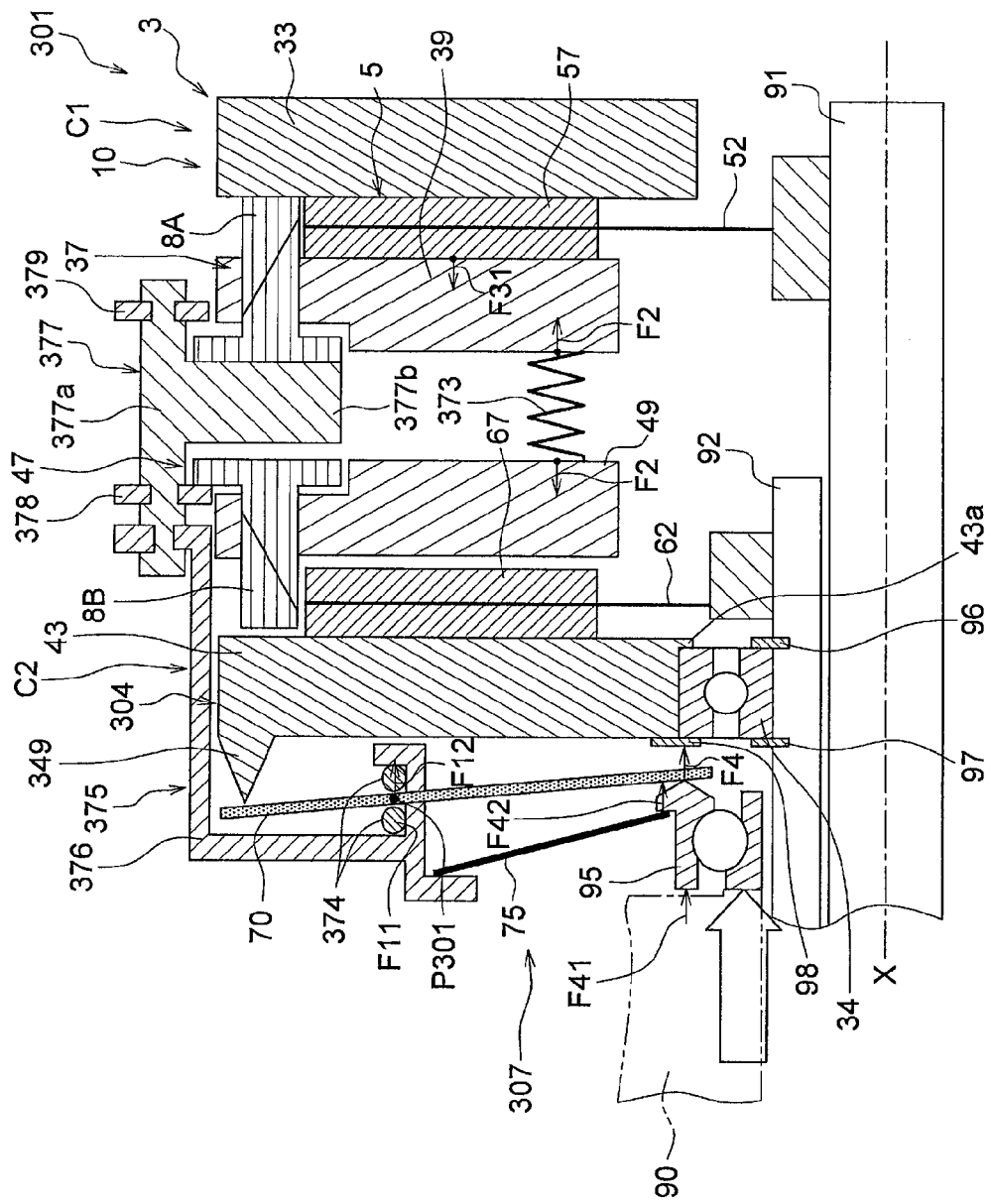
FIG. 10 is a cross-sectional view of the clutch device (the first clutch is set in an engaged state, the fourth exemplary embodiment).

For example, as illustrated in FIGS. 8 to 10, a clutch device 301 includes the input rotor 10, the first pressure plate assembly 37, the second pressure plate assembly 47, the first clutch disc assembly 5, the second clutch disc assembly 6 and a drive mechanism 307. The first clutch C1 is formed by the input rotor 10, the first pressure plate assembly 37 and the first clutch disc assembly 5. The second clutch C2 is formed by the input rotor 10, the second pressure plate assembly 47 and the second clutch disc assembly 6. The first clutch C1 and the second clutch C2 share the drive mechanism 307. The first clutch C1 is a mechanism for transmitting power to the first input shaft 91 and is a clutch of a normal open type in the present exemplary embodiment. On the other hand, the second clutch C2 is a mechanism for transmitting power to the second input shaft 92 and is a clutch of a normal close type in the present exemplary embodiment.

It should be noted that in FIGS. 8 to 10, the engine is disposed on the right side of the clutch device 301, whereas the transmission is disposed on the left side of the clutch device 301, although not illustrated in the figures. Therefore, in FIGS. 8 to 10, the engine side refers to the right side, whereas the transmission side refers to the left side.

Drive Mechanism 307

The drive mechanism 307 is a mechanism for manipulating transmission of power of the first clutch C1 and the second clutch C2. The drive mechanism 307 is configured to transmit axial pressing force to the first pressure plate assembly 37 and the second pressure plate assembly 47. The first clutch C1 and the second clutch C2 share the single drive mechanism 307. Specifically, the drive mechanism 307 includes the diaphragm spring 70, the assist spring 75, a coupling plate assembly 375 and a plurality of intermediate springs 373.

Only one diaphragm spring 70 (an exemplary lever member) is provided for the clutch device 301. The diaphragm spring 70 is a member shared by the first clutch C1 and the second clutch C2. The diaphragm spring 70 is disposed in a preliminarily compressed state for applying elastic force to the second clutch C2. The diaphragm spring 70 is supported by a second flywheel 304 while being elastically deformable. Specifically, the second flywheel 304 has a plurality of support protrusions 349 axially protruding from the second disc portion 43. The outer peripheral part of the diaphragm spring 70 is axially supported by the support protrusions 349. The diaphragm spring 70 makes contact with the coupling plate assembly 375 at a fulcrum P301. The diaphragm spring 70 is preliminarily compressed between the second flywheel 304 and the coupling plate assembly 375. Therefore, the diaphragm spring 70 applies axial pressing force to the second pressure plate assembly 47 through the coupling plate assembly 375. While driving force is not being applied to the diaphragm spring 70, the second clutch disc assembly 6 is interposed between the second disc portion 43 and the second pressure plate 49 by the pressing force of the diaphragm spring 70. In other words, the second clutch C2 is of a normal close type.

The assist spring 75 is provided for reducing driving force in switching the second clutch C2 into the engaged state. The assist spring 75 assists pressing force (second pressing force) to be transmitted to the second clutch C2 through the diaphragm spring 70. Specifically, the assist spring 75 is a cone spring and is disposed on the transmission side of the diaphragm spring 70. The assist spring 75 is supported by the coupling plate assembly 375 while being elastically deformable. The assist spring 75 applies engine-directional assist force to the inner peripheral part of the diaphragm spring 70. In more detail, the inner peripheral part of the assist spring 75 is supported by the release bearing 95. Accordingly, driving force to be applied to the diaphragm spring 70 can be reduced.

The coupling plate assembly 375 (an exemplary intermediate member) is an assembly for transmitting pressing force (either the elastic force of the diaphragm spring 70 or the driving force of the actuator 90) from the diaphragm spring 70 to the first pressure plate assembly 37 and the second pressure plate assembly 47. The coupling plate assembly 375 is disposed while being unitarily rotatable with and axially movable with respect to the input rotor 10, the first pressure plate assembly 37 and the second pressure plate assembly 47. The coupling plate assembly 375 is disposed for driving the first pressure plate assembly 37 in both axial directions and for driving the second pressure plate assembly 47 in both axial directions. Specifically, the coupling plate assembly 375 includes a coupling plate 376, a drive member 377, a first snap ring 378, a second snap ring 379 and two wire rings 374.

The coupling plate 376 is a roughly annular member for transmitting pressing force to the drive member 377 and is coupled to the drive member 377. The two wire rings 374 are attached to the coupling plate 376. The diaphragm spring 70 is interposed between the two wire rings 374, while being axially supported by the coupling plate 376 through the two wire rings 374. Therefore, when the inner peripheral part of the diaphragm spring 70 is driven towards the engine by the release bearing 95, the coupling plate 376 is moved towards the engine.

The drive member 377 is disposed while being axially contactable with the first abrasion tracking mechanism 8A and the second abrasion tracking mechanism 8B. The drive member 377 is coupled to the coupling plate 376. Specifically, the drive member 377 has a first portion 377a elongated in the axial direction and a second portion 377b protruding radially inwards from the first portion 377a. An end of the first portion 377a is coupled to the coupling plate 376. Further, the first snap ring 378 and the second snap ring 379 are attached to the first portion 377a. The first snap ring 378 is a member for driving the second pressure plate assembly 47 towards the engine. The first snap ring 378 is disposed while being axially contactable with the second abrasion tracking mechanism 8B. The second snap ring 379 is a member for driving the first pressure plate assembly 37 towards the transmission. The second snap ring 379 is disposed while being axially contactable with the first abrasion tracking mechanism 8A.

The second portion 377b is disposed axially between the first pressure plate assembly 37 and the second pressure plate assembly 47 (in more detail, axially between the first abrasion tracking mechanism 8A and the second abrasion tracking mechanism 8B). The second portion 377b is disposed while being axially contactable with the first abrasion tracking mechanism 8A. The second portion 377b is also disposed while being axially contactable with the second abrasion tracking mechanism 8B.

The intermediate springs 373 apply the elastic force F2 to the first clutch C1 and the second clutch C2 so that the minimally power transmitted state of the first clutch C1 and that of the second clutch C2 are maintained while the first clutch C1 and the second clutch C2 are switched using the diaphragm spring 70 (when the pressing force F11 is not being applied to the first clutch C1 and the second clutch C2). Specifically, the intermediate springs 373 are disposed axially between the first pressure plate assembly 37 and the second pressure plate assembly 47 while being preliminarily compressed. The both ends of the intermediate springs 373 are supported by protrusions (not illustrated in the figures), holes (not illustrated in the figures) and etc. while being unitarily rotatable with the first pressure plate assembly 37 and the second pressure plate assembly 47. In the present exemplary embodiment, the elastic force F2 of the intermediate springs 373 is set to have a magnitude whereby transmission power in the first clutch C1 and that in the second clutch C2 can be roughly equal to creep power.

Action of Clutch Device 301

As illustrated in FIG. 8, while driving force is not acting on the diaphragm spring 70 from the actuator 90, the elastic force of the diaphragm spring 70 is transmitted to the second pressure plate 49 through the coupling plate assembly 375. As a result, power is transmitted to the transmission from the engine through the second clutch C2.

When the power transmission line is switched from the second clutch C to the first clutch C1, switching of the second clutch C2 and that of the first clutch C1 are executed through the diaphragm spring 70 and the coupling plate assembly 375. Specifically, driving force is inputted into the inner peripheral part of the diaphragm spring 70 from the release bearing 95 while the second clutch C2 is set in the engaged state. As a result, the inner peripheral part of the diaphragm spring 70 is moved towards the engine, and accordingly, the fulcrum P301 of the diaphragm spring 70 is moved towards the engine. Therefore, the elastic force, which is being transmitted to the second pressure plate 49, is gradually reduced and transmission power in the second clutch C2 is gradually reduced.

When the fulcrum P301 of the diaphragm spring 70 is moved towards the transmission, the coupling plate assembly 375 is also moved towards the transmission. At this time, the coupling plate assembly 375 and the first abrasion tracking mechanism 8A are unitarily moved towards the transmission while axially making contact with each other until the cushion force F31 of the first friction portion 57 becomes equal to the elastic force F2 of the intermediate springs 373. When the cushion force F31 becomes equal to the elastic force F2, the intermediate springs 373 are gradually extending, and the first pressure plate assembly 37 is thereby gradually separated away from the second pressure plate assembly 47. At this time, the first abrasion tracking mechanism 8A is axially moved together with the coupling plate assembly 375 while being pressed onto the second portion 377b of the drive member 377. On the other hand, the second abrasion tracking mechanism 8B is axially moved together with the coupling plate assembly 375 while being pressed onto the first snap ring 378.

In the course of time, when the pressing force F11, acting on the fulcrum P301 from the diaphragm spring 70, becomes zero, the cushion force F31 of the first friction portion 57, the cushion force F32 of the second friction portion 67 and the elastic force F2 of the intermediate springs 373 are balanced (see FIG. 9). At this time, the engaged state of the first clutch C1 and that of the second clutch C2 are slightly maintained by the elastic force F2 of the intermediate springs 373. At this time, the transmission power in the first clutch C1 and that in the second clutch C2 are roughly equal to creep power.

When the inner peripheral part of the diaphragm spring 70 is further pressed towards the engine, the first pressure plate assembly 37 begins to be pressed towards the engine by the outer peripheral part of the diaphragm spring 70 through the coupling plate assembly 375. As a result, the first friction portion 57 of the first clutch disc assembly 5 is interposed between the first pressure plate 39 and the first disc portion 33, and the transmission power in the first clutch C1 is increased. When the release bearing 95 is driven to a predetermined position, the pressing force F12, which is transmitted to the first pressure plate 39 through the diaphragm spring 70, is increased and the first clutch C1 is set in the engaged state (see FIG. 10). Accordingly, power is transmitted to the first input shaft 91 through the first clutch C1.

The assist force of the assist spring 75 is acting on the release bearing 95. Therefore, driving force to be applied to the release bearing 95 is reduced in switching the first clutch C1 into the engaged state.

Even with the above-explained clutch device 301, torque transmission prevention can be prevented while reduction in size of the device can be achieved.

Further, the input rotor 10 is restricted from axially moving towards the engine by the first input shaft 91 and the second input shaft 92. Therefore, even when axial clutch driving force is inputted into the diaphragm spring 70, the first input shaft 91 and the second input shaft 92 can receive the clutch driving force. Accordingly, the clutch driving force can be prevented from being transmitted to the engine.

Further, pressing force is transmitted to the first pressure plate assembly 37 and the second pressure plate assembly 47 through the single diaphragm spring 70. Therefore, it is required to provide only one actuator 90. Accordingly, reduction in size of the device can be achieved.

Therefore, according to the present clutch device 301, the clutch driving force can be prevented from being transmitted to the engine, while reduction in size of the device can be achieved. Torque transmission prevention can be prevented while reduction in size can be achieved.

Fifth Exemplary Embodiment

In the aforementioned fourth exemplary embodiment, the first clutch C1 is of a normal open type, whereas the second clutch C2 is of a normal close type. However, the first clutch C1 can be of a normal close type, whereas the second clutch C2 can be of a normal open type.

Figure 11:
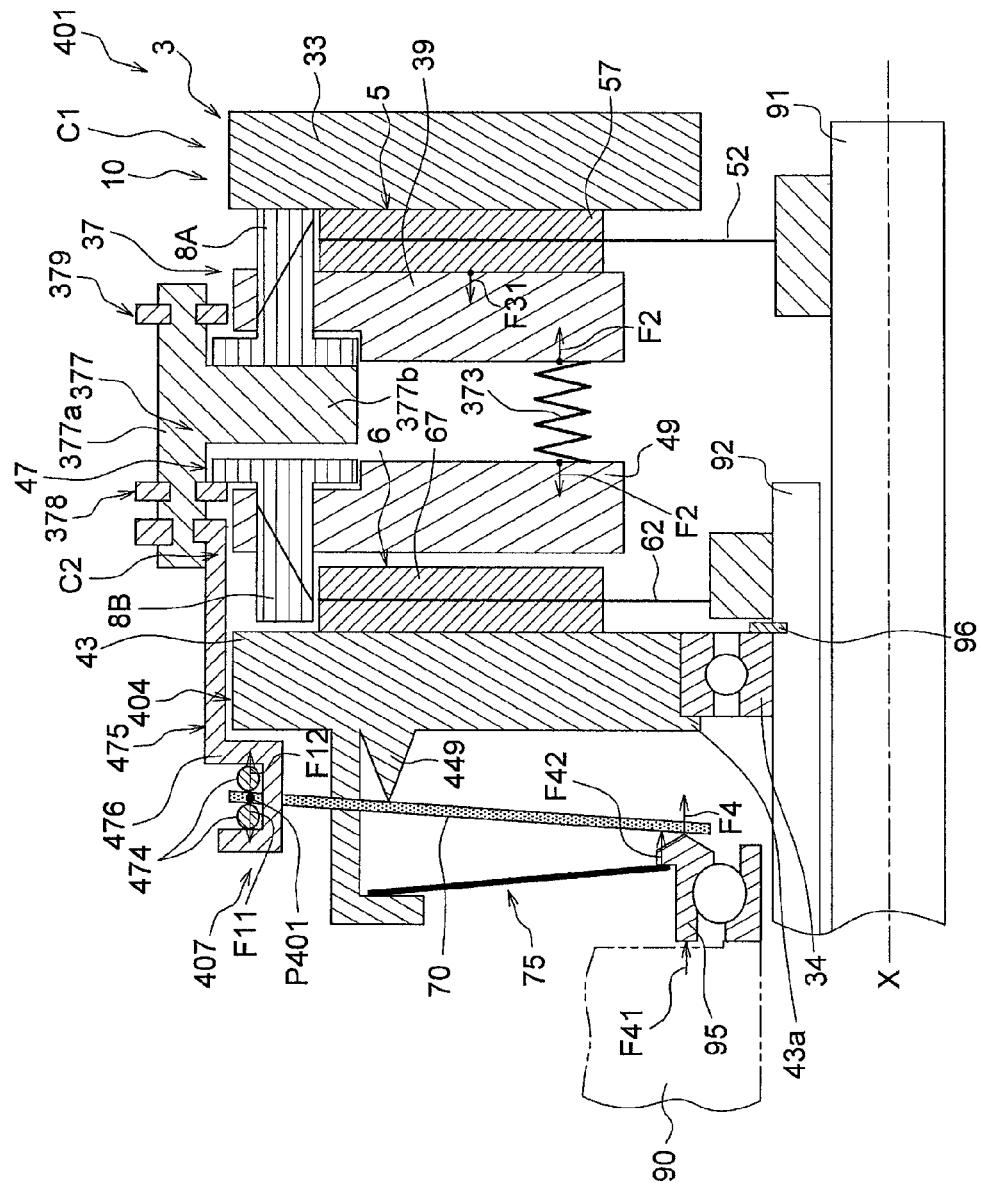
FIG. 11 is a cross-sectional view of a clutch device (a fifth exemplary embodiment).

For example, as illustrated in FIG. 11, a clutch device 401 includes the input rotor 10, the first pressure plate assembly 37, the second pressure plate assembly 47, the first clutch disc assembly 5, the second clutch disc assembly 6, the first abrasion tracking mechanism 8A, the second abrasion tracking mechanism 8B and a drive mechanism 407. The first clutch C1 is formed by the input rotor 10, the first pressure plate assembly 37 and the first clutch disc assembly 5. The second clutch C2 is formed by the input rotor 10, the second pressure plate assembly 47 and the second clutch disc assembly 6. The first clutch C1 and the second clutch C2 share the drive mechanism 407. The first clutch C1 is a mechanism for transmitting power to the first input shaft 91 and is a clutch of a normal close type in the present exemplary embodiment. On the other hand, the second clutch C2 is a mechanism for transmitting power to the second input shaft 92 and is a clutch of a normal open type in the present exemplary embodiment.

It should be noted that in FIG. 11, the engine is disposed on the right side of a clutch device 401, whereas the transmission is disposed on the left side of the clutch device 401, although not illustrated in the figure. Therefore, in FIG. 11, the engine side refers to the right side, whereas the transmission side refers to the left side.

Drive Mechanism 407

The drive mechanism 407 is a mechanism for manipulating transmission of power of the first clutch C1 and the second clutch C2. The drive mechanism 407 is configured to transmit axial pressing force to the first pressure plate assembly 37 and the second pressure plate assembly 47. The first clutch C1 and the second clutch C2 share the single drive mechanism 407. Specifically, the drive mechanism 407 includes the diaphragm spring 70, the assist spring 75, a coupling plate assembly 475 and the plural intermediate springs 373.

Only one diaphragm spring 70 (an exemplary lever member) is provided for the clutch device 401. The diaphragm spring 70 is a member shared by the first clutch C1 and the second clutch C2. The diaphragm spring 70 is disposed in a preliminarily compressed state for applying elastic force to the second clutch C2. The diaphragm spring 70 is supported by a second flywheel 404 while being elastically deformable. Specifically, the second flywheel 404 has a plurality of support protrusions 449 axially protruding from the second disc portion 43. The diaphragm spring 70 is axially supported by the support protrusions 449. The diaphragm spring 70 makes contact with the coupling plate assembly 475 at a fulcrum P401. The diaphragm spring 70 is preliminarily compressed between the second flywheel 404 and the coupling plate assembly 475. Therefore, the diaphragm spring 70 applies axial pressing force to the second pressure plate assembly 47 through the coupling plate assembly 475. While driving force is not being applied to the diaphragm spring 70, the first clutch disc assembly 5 is interposed between the first disc portion 33 and the first pressure plate 39 by the pressing force of the diaphragm spring 70. In other words, the first clutch C1 is of a normal close type.

The assist spring 75 is provided for reducing driving force in switching the second clutch C2 into the engaged state. The assist spring 75 assists pressing force (second pressing force) to be transmitted to the second clutch C2 through the diaphragm spring 70. Specifically, the assist spring 75 is a cone spring and is disposed on the transmission side of the diaphragm spring 70. The assist spring 75 is supported by the coupling plate assembly 475 while being elastically deformable. The assist spring 75 applies the engine-directional assist force F42 to the inner peripheral part of the diaphragm spring 70. In more detail, the inner peripheral part of the assist spring 75 is supported by the release bearing 95. Accordingly, driving force to be applied to the diaphragm spring 70 can be reduced.

The coupling plate assembly 475 (an exemplary intermediate member) is an assembly for transmitting pressing force (either the elastic force of the diaphragm spring 70 or the driving force of the actuator 90) from the diaphragm spring 70 to the first pressure plate assembly 37 and the second pressure plate assembly 47. The coupling plate assembly 475 is disposed while being unitarily rotatable with and axially movable with respect to the input rotor 10, the first pressure plate assembly 37 and the second pressure plate assembly 47. The coupling plate assembly 475 is disposed for driving the first pressure plate assembly 37 in both axial directions and for driving the second pressure plate assembly 47 in both axial directions. Specifically, the coupling plate assembly 475 includes a coupling plate 476, the drive member 377, the first snap ring 378, the second snap ring 379 and two wire rings 474.

The coupling plate 476 is a roughly annular member for transmitting pressing force to the drive member 377 and is coupled to the drive member 377. The two wire rings 474 are attached to the coupling plate 476. The diaphragm spring 70 is interposed at the outer peripheral part thereof between the two wire rings 474, while being axially supported by the coupling plate 476 through the two wire rings 474. Therefore, when the inner peripheral part of the diaphragm spring 70 is driven towards the engine by the release bearing 95, the coupling plate 476 is moved towards the transmission. The drive member 377 is coupled to the coupling plate 476. The first snap ring 378 and the second snap ring 379 are attached to the drive member 377.

The intermediate springs 373 apply the elastic force F2 (coupling maintaining force) to the first clutch C1 and the second clutch C2 so that the engaged state of the first clutch C1 and that of the second clutch C2 are maintained while the first clutch C1 and the second clutch C2 are switched using the diaphragm spring 70. Specifically, the intermediate springs 373 are disposed axially between the first pressure plate assembly 37 and the second pressure plate assembly 47 while being preliminarily compressed. The both ends of the intermediate springs 373 are supported by protrusions (not illustrated in the figure), holes (not illustrated in the figure) and etc. while being unitarily rotatable with the first pressure plate assembly 37 and the second pressure plate assembly 47. In the present exemplary embodiment, the elastic force F2 of the intermediate springs 373 is set to have a magnitude whereby transmission power in the first clutch C1 and that in the second clutch C2 can be roughly equal to creep power.

Action of Clutch Device 401

As illustrated in FIG. 11, while driving power is not acting on the diaphragm spring 70 from the actuator 90, the elastic force of the diaphragm spring 70 is transmitted to the first pressure plate 39 through the coupling plate assembly 475. As a result, power is transmitted to the transmission from the engine through the first clutch C1.

When the power transmission line is switched from the first clutch C1 to the second clutch C2, switching of the first clutch C1 and that of the second clutch C2 are executed through the shared diaphragm spring 70 and the coupling plate assembly 475. Specifically, driving force is inputted into the inner peripheral part of the diaphragm spring 70 from the release bearing 95, while the first clutch C1 is set in the engaged state. As a result, the inner peripheral part of the diaphragm spring 70 is moved towards the engine, and accordingly, the fulcrum P401 of the diaphragm spring 70 is moved towards the transmission. Therefore, the elastic force, which is being transmitted to the first pressure plate 39, is gradually reduced and transmission power in the first clutch C1 is gradually reduced.

When the fulcrum P401 of the diaphragm spring 70 is moved towards the transmission, the coupling plate assembly 475 is also moved towards the transmission. At this time, the coupling plate assembly 475 and the first abrasion tracking mechanism 8A are unitarily moved towards the transmission while axially making contact with each other until the cushion force F31 of the first friction portion 57 becomes equal to the elastic force F2 of the intermediate springs 373. When the cushion force F31 becomes equal to the elastic force F2, the intermediate springs 373 are gradually extending, and the first pressure plate assembly 37 is thereby gradually separated away from the second pressure plate assembly 47. At this time, the first abrasion tracking mechanism 8A is axially moved together with the coupling plate assembly 475 while being pressed onto the second portion 377b of the drive member 377. On the other hand, the second abrasion tracking mechanism 8B is axially moved together with the coupling plate assembly 475 while being pressed onto the first snap ring 378.

When the coupling plate assembly 475 is moved towards the transmission, the coupling plate assembly 475 makes contact with the second abrasion tracking mechanism 8B, and the second pressure plate assembly 47 is pressed towards the transmission by the coupling plate assembly 475. As a result, the torque capacity of the second clutch C2 is gradually increased and the cushion force F32 of the second friction portion 67 is also gradually increased.

In the course of time, when the pressing force F11, acting on the fulcrum P401 from the diaphragm spring 70, becomes zero, the cushion force F31 of the first friction portion 57, the cushion force F32 of the second friction portion 67 and the elastic force F2 of the intermediate springs 373 are balanced. At this time, the minimally power transmitted state of the first clutch C1 and that of the second clutch C2 are maintained by the elastic force F2 of the intermediate springs 373. At this time, the transmission power in the first clutch C1 and that in the second clutch C2 are roughly equal to creep power.

When the inner peripheral part of the diaphragm spring 70 is further pressed towards the engine, the coupling plate assembly 475 begins to be pressed towards the transmission by the outer peripheral part of the diaphragm spring 70. As a result, the second friction portion 67 of the second clutch disc assembly 6 is interposed between the second pressure plate 49 and the second disc portion 43, and the transmission power in the second clutch C2 is increased. When the release bearing 95 is driven to a predetermined position, the pressing force F12, which is transmitted to the second pressure plate 49 through the diaphragm spring 70, is increased and the second clutch C2 is set in the engaged state. Accordingly, power is transmitted to the second input shaft 92 through the second clutch C2.

The assist force of the assist spring 75 is acting on the release bearing 95. Therefore, driving force to be applied to the release bearing 95 is reduced in switching the second clutch C2 into the engaged state.

Even with the above-explained clutch device 401, torque transmission prevention can be prevented, while reduction in size of the device can be achieved.

Further, the input rotor 10 is restricted from axially moving towards the engine by the first input shaft 91 and the second input shaft 92. Therefore, even when axial clutch driving force is inputted into the diaphragm spring 70, the first input shaft 91 and the second input shaft 92 can receive the clutch driving force. Accordingly, the clutch driving force can be prevented from being transmitted to the engine.

Further, pressing force is transmitted to the first pressure plate assembly 37 and the second pressure plate assembly 47 through the single diaphragm spring 70. Therefore, it is required to provide only one actuator 90. Accordingly, reduction in size of the device can be achieved.

Therefore, according to the present clutch device 401, the clutch driving force can be prevented from being transmitted to the engine, while reduction in size of the device can be achieved.

Sixth Exemplary Embodiment

In the aforementioned fourth and fifth exemplary embodiments, the clutch of a normal open type and that of a normal close type are used in combination. However, both of the first clutch and the second clutch can be clutches of a normal open type.

Figure 12:
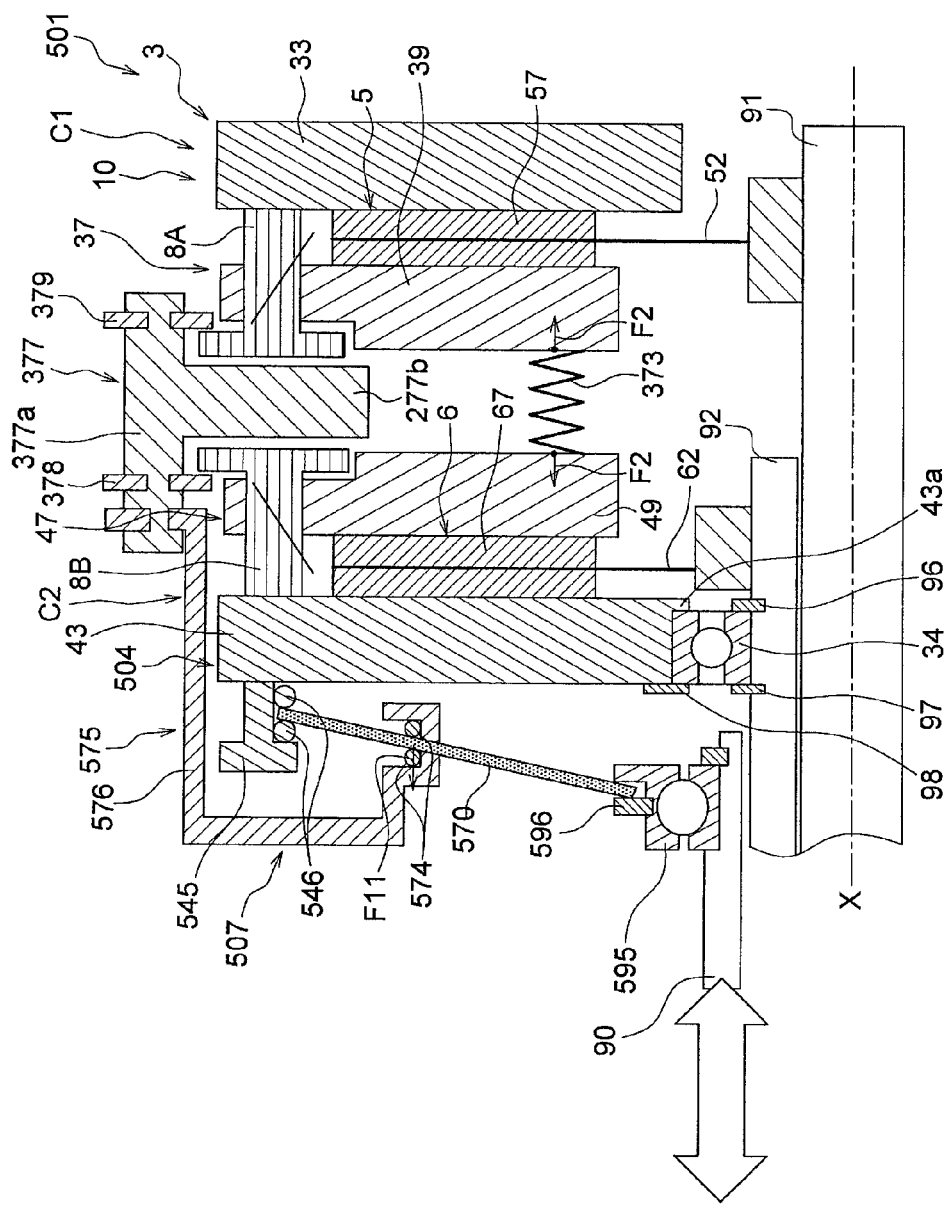
FIG. 12 is a cross-sectional view of a clutch device (a sixth exemplary embodiment).

For example, as illustrated in FIG. 12, a clutch device 501 includes the input rotor 10, the first pressure plate assembly 37, the second pressure plate assembly 47, the first clutch disc assembly 5, the second clutch disc assembly 6, the first abrasion tracking mechanism 8A, the second abrasion tracking mechanism 8B and a drive mechanism 507. The first clutch C1 is formed by the input rotor 10, the first pressure plate assembly 37 and the first clutch disc assembly 5. The second clutch C2 is formed by the input rotor 10, the second pressure plate assembly 47 and the second clutch disc assembly 6. In other words, the first clutch C1 and the second clutch C2 share the drive mechanism 507. The first clutch C1 is a mechanism for transmitting power to the first input shaft 91 and is a clutch of a normal open type in the present exemplary embodiment. On the other hand, the second clutch C2 is a mechanism for transmitting power to the second input shaft 92 and is a clutch of a normal open type in the present exemplary embodiment.

It should be noted that in FIG. 12, the engine is disposed on the right side of a clutch device 501, whereas the transmission is disposed on the left side of the clutch device 501, although not illustrated in the figure. Therefore, in FIG. 12, the engine side refers to the right side, whereas the transmission side refers to the left side.

Drive Mechanism 507

The drive mechanism 507 is a mechanism for manipulating transmission of power of the first clutch C1 and the second clutch C2. The drive mechanism 507 is configured to transmit axial pressing force to the first pressure plate assembly 37 and the second pressure plate assembly 47. The first clutch C1 and the second clutch C2 share the single drive mechanism 507. Specifically, the drive mechanism 507 includes a drive lever 570, the assist spring 75, a coupling plate assembly 575 and the plural intermediate springs 373.

Only one drive lever 570 (an exemplary lever member) is provided for the clutch device 501. The drive lever 570 is a member shared by the first clutch C1 and the second clutch C2. Unlike the aforementioned fourth and fifth exemplary embodiments, the drive lever 570 is a member with low stiffness and transmits driving force from the actuator 90 to the coupling plate assembly 575. The drive lever 570 is supported by the second flywheel 4 while being elastically deformable. A plurality of support members 545 are fixed to a second flywheel 504. Two wire rings 546 are attached to the plural support members 545. The drive lever 570 is supported by the support members 545 through the two wire rings 546 while being elastically deformable.

As illustrated in FIG. 12, while driving force is not being applied to the drive lever 570, the engaged state of the first clutch C1 and that of the second clutch C2 are slightly maintained by the elastic force of the intermediate springs 373. The inner peripheral part of the drive lever 570 is axially supported by a release bearing 595. A snap ring 596 is attached to the release bearing 595. The inner peripheral part of the drive lever 570 is interposed between the release bearing 595 and the snap ring 596. The actuator 90 is disposed for applying driving force to the drive lever 570 in both axial directions. Driving force can be transmitted to the drive lever 570 from the actuator 90 through the release bearing 595 in both axial directions (towards the engine and the transmission).

The coupling plate assembly 575 is an assembly for transmitting pressing force (the driving force of the actuator 90) from the drive lever 570 to the first pressure plate assembly 37 and the second pressure plate assembly 47. The coupling plate assembly 575 is disposed while being unitarily rotatable with and axially movable with respect to the input rotor 10, the first pressure plate assembly 37 and the second pressure plate assembly 47. The coupling plate assembly 575 is disposed for driving the first pressure plate assembly 37 in both axial directions and for driving the second pressure plate assembly 47 in both axial directions. Specifically, the coupling plate assembly 575 includes a coupling plate 576, the drive member 377, the first snap ring 378, the second snap ring 379 and two wire rings 574.

The coupling plate 576 is a roughly annular member for transmitting pressing force to the drive member 377 and is coupled to the drive member 377. The two wire rings 574 are attached to the coupling plate 576. The drive lever 570 is interposed between the two wire rings 574, while being axially supported by the coupling plate 576 through the two wire rings 574. When the inner peripheral part of the drive lever 570 is driven towards the engine by the release bearing 95, the coupling plate 576 is moved towards the engine. The drive member 377 is coupled to the coupling plate 576. The first snap ring 378 and the second snap ring 379 are attached to the drive member 377.

The intermediate springs 373 apply the elastic force F2 to the first clutch C1 and the second clutch C2 so that the minimally power transmitted state of the first clutch C1 and that of the second clutch C2 are maintained while the first clutch C1 and the second clutch C2 are switched using the drive lever 570 (when the pressing force F11 is not being applied to the first clutch C1 and the second clutch C2). Specifically, the intermediate springs 373 are disposed axially between the first pressure plate assembly 37 and the second pressure plate assembly 47 while being preliminarily compressed. The both ends of the intermediate springs 373 are supported by protrusions (not illustrated in the figure), holes (not illustrated in the figure) and etc. while being unitarily rotatable with the first pressure plate assembly 37 and the second pressure plate assembly 47. In the present exemplary embodiment, the elastic force F2 of the intermediate springs 373 is set to have a magnitude whereby transmission power in the first clutch C1 and that in the second clutch C2 can be roughly equal to creep power.

Action of Clutch Device 501

As illustrated in FIG. 12, while driving force is not acting on the drive lever 570 from the actuator 90, pressing force is not transmitted to the first pressure plate assembly 37 and the second pressure plate assembly 47 from the drive lever 570.

On the other hand, the first pressure plate assembly 37 is being pressed towards the engine by the elastic force F2 of the intermediate springs 373, whereas the second pressure plate assembly 47 is being pressed towards the transmission. Specifically, elastic force is being transmitted to the first pressure plate 39 from the intermediate springs 373 through the coupling plate assembly 575 and the first abrasion tracking mechanism 8A. On the other hand, elastic force is being transmitted to the second pressure plate 49 from the intermediate springs 373 through the coupling plate assembly 575 and the second abrasion tracking mechanism 8B. Therefore, while driving force is not transmitted to the drive lever 570, the minimally power transmitted state of the first clutch C1 and that of the second clutch C2 are maintained by the elastic force F2 of the intermediate springs 373.

When transmission-directional driving force is transmitted to the inner peripheral part of the drive lever 570 from the release bearing 595 under the condition illustrated in FIG. 12, the coupling plate assembly 575 is pressed towards the engine through the drive lever 570. As a result, the intermediate springs 373 are compressed between the first pressure plate 39 and the second pressure plate 49. The inner peripheral part of the drive lever 570 is further pressed towards the engine. The first pressure plate assembly 37 is pressed towards the engine through the coupling plate assembly 575. As a result, the first clutch C1 is set in the engaged state.

On the other hand, when engine-directional driving force is transmitted to the inner peripheral part of the drive lever 570 from the release bearing 595 under the condition illustrated in FIG. 12, the coupling plate assembly 575 is pressed towards the transmission through the drive lever 570. As a result, the intermediate springs 373 are compressed between the first pressure plate 39 and the second pressure plate 49, and the second pressure plate 49 is pressed towards the transmission by the drive lever 570 through the coupling plate assembly 575 and the second abrasion tracking mechanism 8B. As a result, the second clutch C2 is set in the engaged state.

Even with the above-explained clutch device 501, torque transmission prevention can be prevented while reduction in size of the device can be achieved.

Further, the input rotor 10 is restricted from moving in both axial directions by the first input shaft 91 and the second input shaft 92. Therefore, even when axial clutch driving force is inputted into the diaphragm spring 70, the first input shaft 91 and the second input shaft 92 can receive the clutch driving force. Accordingly, the clutch driving force can be prevented from being transmitted to the engine.

Further, pressing force is transmitted to the first pressure plate assembly 37 and the second pressure plate assembly 47 through the single diaphragm spring 70. Therefore, it is required to provide only one actuator 90. Accordingly, reduction in size of the device can be achieved.

Therefore, according to the present clutch device 501, the clutch driving force can be prevented from being transmitted to the engine, while reduction in size of the device can be achieved.

Seventh Exemplary Embodiment

In the aforementioned exemplary embodiments, the input rotor 10 includes the first flywheel 3 and the second flywheel 4. However, the input rotor 10 can be formed by a single flywheel disposed between the first pressure plate assembly 37 and the second pressure plate assembly 47.

Figure 13:
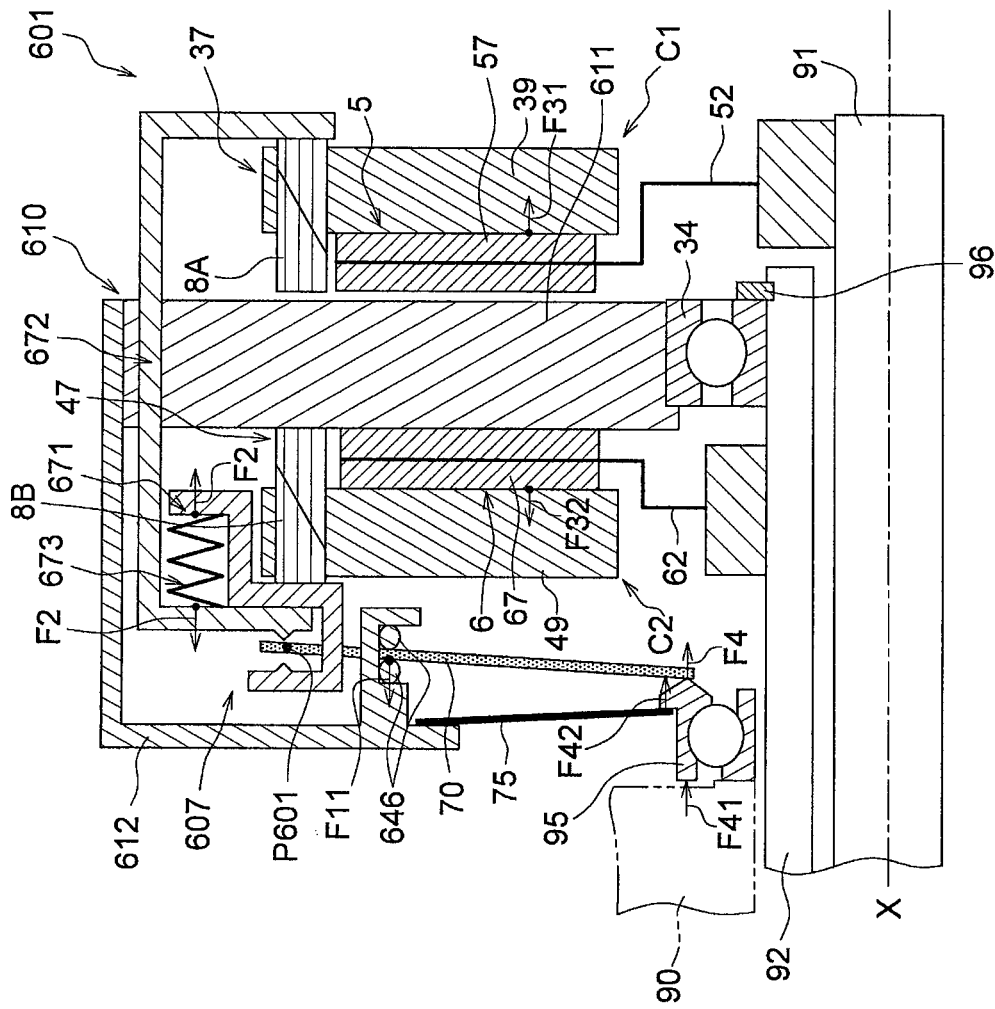
FIG. 13 is a cross-sectional view of a clutch device (a seventh exemplary embodiment).

For example, as illustrated in FIG. 13, a clutch device 601 includes an input rotor 610, the first pressure plate assembly 37, the second pressure plate assembly 47, the first clutch disc assembly 5, the second clutch disc assembly 6, the first abrasion tracking mechanism 8A, the second abrasion tracking mechanism 8B and a drive mechanism 607. The first clutch C1 is formed by the input rotor 610, the first pressure plate assembly 37 and the first clutch disc assembly 5. The second clutch C2 is formed by the input rotor 610, the second pressure plate assembly 47 and the second clutch disc assembly 6. The first clutch C1 and the second clutch C2 share the drive mechanism 607. The first clutch C1 is a mechanism for transmitting power to the first input shaft 91 and is a clutch of a normal open type in the present exemplary embodiment. On the other hand, the second clutch C2 is a mechanism for transmitting power to the second input shaft 92 and is a clutch of a normal close type in the present exemplary embodiment. For example, the first clutch C1 is configured to transmit power at first, third and fifth speed stages, whereas the second clutch C2 is configured to transmit power at second and fourth speed stages.

It should be noted that in FIG. 13, the engine is disposed on the right side of the clutch device 601, whereas the transmission is disposed on the left side of the clutch device 601, although not illustrated in the figure. Therefore, in FIG. 13, the engine side refers to the right side, whereas the transmission side refers to the left side.

Input Rotor 610

The input rotor 610 is a member to which power is transmitted from the engine. The input rotor 610 is coupled to the crankshaft (not illustrated in the figure) through the flexible plate (not illustrated in the figure). The input rotor 610 is rotated about the rotary axis X. The input rotor 610 mainly includes a flywheel 611 and a support member 612.

The flywheel 611 is disposed between the first pressure plate assembly 37 and the second pressure plate assembly 47 (in more detail, between the first clutch disc assembly 5 and the second clutch disc assembly 6), while being rotatably supported by the second input shaft 92 through the bearing 34. The bearing 34 is restricted from moving towards the engine by the snap ring 96 attached to the second input shaft 92. Accordingly, the flywheel 611 is restricted from moving towards the engine with respect to the second input shaft 92. The bearing 34 and the snap ring 96 receive either the driving force of the actuator 90 in switching the first clutch C1 into the release state or the driving force of the actuator 90 in switching the second clutch C2 into the engaged state.

The support member 612 is a roughly annular member supporting the diaphragm spring 70 and the assist spring 75 and is fixed to the outer peripheral part of the flywheel 611.

Drive Mechanism 607

The drive mechanism 607 is a mechanism for manipulating transmission of power of the first clutch C1 and the second clutch C2. The drive mechanism 607 is configured to transmit axial pressing force to the first pressure plate assembly 37 and the second pressure plate assembly 47. The first clutch C1 and the second clutch C2 share the single drive mechanism 607. Specifically, the drive mechanism 607 includes the diaphragm spring 70, the assist spring 75, a first intermediate plate 671, a second intermediate plate 672 and a plurality of intermediate springs 673.

Only one diaphragm spring 70 (an exemplary lever member) is provided for the clutch device 601. The diaphragm spring 70 is a member shared by the first clutch C1 and the second clutch C2. The diaphragm spring 70 is disposed in a preliminarily compressed state for applying elastic force to the first clutch C1. Specifically, the diaphragm spring 70 is supported by the flywheel 611 while being elastically deformable. The diaphragm spring 70 applies axial pressing force to the second pressure plate 49 through the second intermediate plate 672 and the first intermediate plate 671. Two wire rings 646 are attached to the support member 612. The diaphragm spring 70 is supported by the support member 612 through the two wire rings 646 while being elastically deformable.

While driving force is not being applied to the diaphragm spring 70, the second clutch disc assembly 6 is interposed between the flywheel 611 and the second pressure plate 49 by the pressing force of the diaphragm spring 70. In other words, the second clutch C2 is of a normal close type.

The assist spring 75 is provided for reducing driving force in switching the second clutch C2 into the engaged state. The assist spring 75 assists pressing force (second pressing force) to be transmitted to the second clutch C2 through the diaphragm spring 70. Specifically, the assist spring 75 is a cone spring and is disposed on the transmission side of the diaphragm spring 70. The assist spring 75 is supported by the support member 612 fixed to the flywheel 611 while being elastically deformable. The assist spring 75 applies engine-directional assist force to the inner peripheral part of the diaphragm spring 70. In more detail, the inner peripheral part of the assist spring 75 is supported by the release bearing 95. Accordingly, driving force to be applied to the diaphragm spring 70 can be reduced.

The first intermediate plate 671 is a member for transmitting pressing force (the driving force of the actuator 90) from the diaphragm spring 70 to the first pressure plate assembly 37. The first intermediate plate 671 is disposed while being unitarily rotatable with and axially movable with respect to the input rotor 610, the first pressure plate assembly 37 and the second pressure plate assembly 47. While pressing force is being applied to the first clutch C1 from the diaphragm spring 70 through the first intermediate plate 671, the second intermediate plate 672 is driven towards the transmission by the first intermediate plate 671. In more detail, while driving force is being applied to the first intermediate plate 671 from the actuator 90 through the diaphragm spring 70, the first intermediate plate 671 is pressed towards the transmission by the diaphragm spring 70. At this time, the first intermediate plate 671 is disposed while being hooked on the second intermediate plate 672. Therefore, the second intermediate plate 672 is moved towards the transmission together with the first intermediate plate 671. At this time, the first pressure plate assembly 37 is pressed towards the transmission by the second intermediate plate 672. Thus, the driving force of the actuator 90 is transmitted to the first pressure plate assembly 37 through the diaphragm spring 70, the first intermediate plate 671 and the second intermediate plate 672.

The second intermediate plate 672 is a member for transmitting pressing force (the elastic force of the diaphragm spring 70) from the diaphragm spring 70 to the second pressure plate assembly 47. The second intermediate plate 672 is disposed while being unitarily rotatable with and axially movable with respect to the input rotor 610, the first pressure plate assembly 37 and the second pressure plate assembly 47. While pressing force is being applied to the second clutch C2 from the actuator 90 through the diaphragm spring 70 and the second intermediate plate 672, a part of the first intermediate plate 671 is interposed between the second intermediate plate 672 and the second pressure plate assembly 47. In more detail, when the diaphragm spring 70 presses the second intermediate plate 672 towards the engine, the elastic force of the diaphragm spring 70 is transmitted to the first pressure plate 39 through the second intermediate plate 672 and the first intermediate plate 671. At this time, a part of the first intermediate plate 671 is interposed between the second intermediate plate 672 and the second abrasion tracking mechanism 8B.

The intermediate springs 673 apply the elastic force F2 (coupling maintaining force) to the first clutch C1 and the second clutch C2 so that the minimally power transmitted state of the first clutch C1 and that of the second clutch C2 are maintained while the first clutch C1 and the second clutch C2 are switched using the diaphragm spring 70 (when the pressing force F11 is not being applied to the first clutch C1 and the second clutch C2). Specifically, the intermediate springs 673 are disposed between the first intermediate plate 671 and the second intermediate plate 672 while being preliminarily compressed. In the present exemplary embodiment, the elastic force F2 of the intermediate springs 673 is set to have a magnitude whereby the transmission power in the first clutch C1 and that in the second clutch C2 can be roughly equal to creep power.

The intermediate springs 673 press the first intermediate plate 671 towards the engine. The intermediate springs 673 press the second intermediate plate 672 towards the transmission. The intermediate springs 673 are disposed at equal intervals in the circumferential direction. The intermediate springs 673 are supported by the first intermediate plate 671 and the second intermediate plate 672 while being elastically deformable.

Action of Clutch Device 601

As illustrated in FIG. 13, while driving force is not being applied to the diaphragm spring 70 from the actuator 90, the elastic force of the diaphragm spring 70 is transmitted to the second pressure plate 49 through the second intermediate plate 672, the first intermediate plate 671 and the second abrasion tracking mechanism 8B. As a result, power is transmitted to the transmission from the engine through the second clutch C2.

When the power transmission line is switched from the second clutch C2 to the first clutch C1, switching of the second clutch C2 and that of the first clutch C1 are executed through the shared diaphragm spring 70. Specifically, driving force is inputted into the inner peripheral part of the diaphragm spring 70 from the release bearing 95 while the second clutch C2 is set in the engaged state. As a result, the inner peripheral part of the diaphragm spring 70 is moved towards the engine, and accordingly, the outer peripheral part (a fulcrum P601) of the diaphragm spring 70 is moved towards the transmission. As a result, the elastic force, which is being transmitted to the second pressure plate 49, is gradually reduced, and the transmission power in the second clutch C2 is gradually reduced.

When the fulcrum P601 of the diaphragm spring 70 is moved towards the transmission, the first intermediate plate 671, the second intermediate plate 672 and the intermediate springs 673 are also moved towards the transmission. At this time, the first intermediate plate 671 and the second intermediate plate 672 are unitarily moved towards the transmission while axially making contact with each other until the cushion force F32 of the second friction portion 67 becomes equal to the elastic force F2 of the intermediate springs 673. When the cushion force F32 becomes equal to the elastic force F2, the intermediate springs 673 are gradually extending and the second intermediate plate 672 is thereby gradually separated away from the first intermediate plate 671. At this time, the second intermediate plate 672 is axially moved while being pressed onto the diaphragm spring 70. On the other hand, the first intermediate plate 671 is axially moved while being pressed onto the second abrasion tracking mechanism 8B.

When the second intermediate plate 672 is moved towards the transmission, the second intermediate plate 672 makes contact with the first abrasion tracking mechanism 8A, and the first pressure plate assembly 37 is pressed towards the transmission by the second intermediate plate 672. As a result, the torque capacity of the first clutch C1 is gradually increased, and the cushion force F31 of the first friction portion 57 is also gradually increased.

In the course of time, when the elastic force F2 of the intermediate springs 673 becomes equal to the cushion force F31 of the first friction portion 57 and the cushion force F32 of the second friction portion 67, the second intermediate plate 672 is stopped moving, and the second intermediate plate 672 is separated away from the outer peripheral part of the diaphragm spring 70. As a result, the pressing force F11, acting on the second intermediate plate 672 from the diaphragm spring 70, becomes zero and the cushion force F31 of the first friction portion 57, the cushion force F32 of the second friction portion 67 and the elastic force F2 of the intermediate springs 673 are balanced. At this time, the engaged state of the first clutch C1 and that of the second clutch C2 are slightly maintained by the elastic force F2 of the intermediate springs 673. At this time, the transmission power in the first clutch C1 and that in the second clutch C2 are roughly equal to creep power.

Further, when the inner peripheral part of the diaphragm spring 70 is pressed towards the engine, the first intermediate plate 671 is pressed towards the transmission by the outer peripheral part of the diaphragm spring 70. As a result, the first friction portion 57 of the first clutch disc assembly 5 is interposed between the first pressure plate 39 and the flywheel 611, and the transmission power is the first clutch C1 is increased. When the release bearing 95 is driven to a predetermined position, pressing force to be transmitted to the first pressure plate 39 through the diaphragm spring 70 is increased and the first clutch C1 is set in the engaged state. Accordingly, power is transmitted to the first input shaft 91 through the first clutch C1.

The assist force of the assist spring 75 is acting on the release bearing 95. Therefore, driving force to be applied to the release bearing 95 is reduced in switching the first clutch C1 into the engaged state.

Even with the above-explained clutch device 601, torque transmission prevention can be prevented while reduction in size of the device can be achieved.

Further, the input rotor 10 is restricted from axially moving towards the engine by the first input shaft 91 and the second input shaft 92. Therefore, even when axial clutch driving force is inputted into the diaphragm spring 70, the first input shaft 91 and the second input shaft 92 can receive the clutch driving force. Accordingly, the clutch driving force can be prevented from being transmitted to the engine.

Further, pressing force is transmitted to the first pressure plate assembly 37 and the second pressure plate assembly 47 through the single diaphragm spring 70. Therefore, it is required to provide only one actuator 90. Accordingly, reduction in size of the device can be achieved.

Therefore, according to the present clutch device 601, the clutch driving force can be prevented from being transmitted to the engine, while reduction in size of the device can be achieved.

Eighth Exemplary Embodiment

In the aforementioned first to seventh exemplary embodiments, torque transmission prevention is prevented using the intermediate springs 73, 373 and 673, and the elastic force F2 of the intermediate springs 73, 373 and 673 is set to have a magnitude whereby transmission power in the first clutch C1 and that in the second clutch C2 can be roughly equal to creep power.

However, a case can be assumed that transmission power is not enough for some travelling states of the vehicle when set to be creep power. For example, the clutch device is transmitting large power when the gear stage of the transmission is shifted from the first speed stage to the second speed stage in hill climbing. Therefore, chances are that a phenomenon similar to torque transmission prevention is caused when the power transmission line is switched from the first clutch to the second clutch.

In view of this, either the first input shaft 91 or the second input shaft 92 can be additionally provided with a power source configured to supplementarily input power. The power source will be herein explained as a part of the clutch device.

Figure 14:
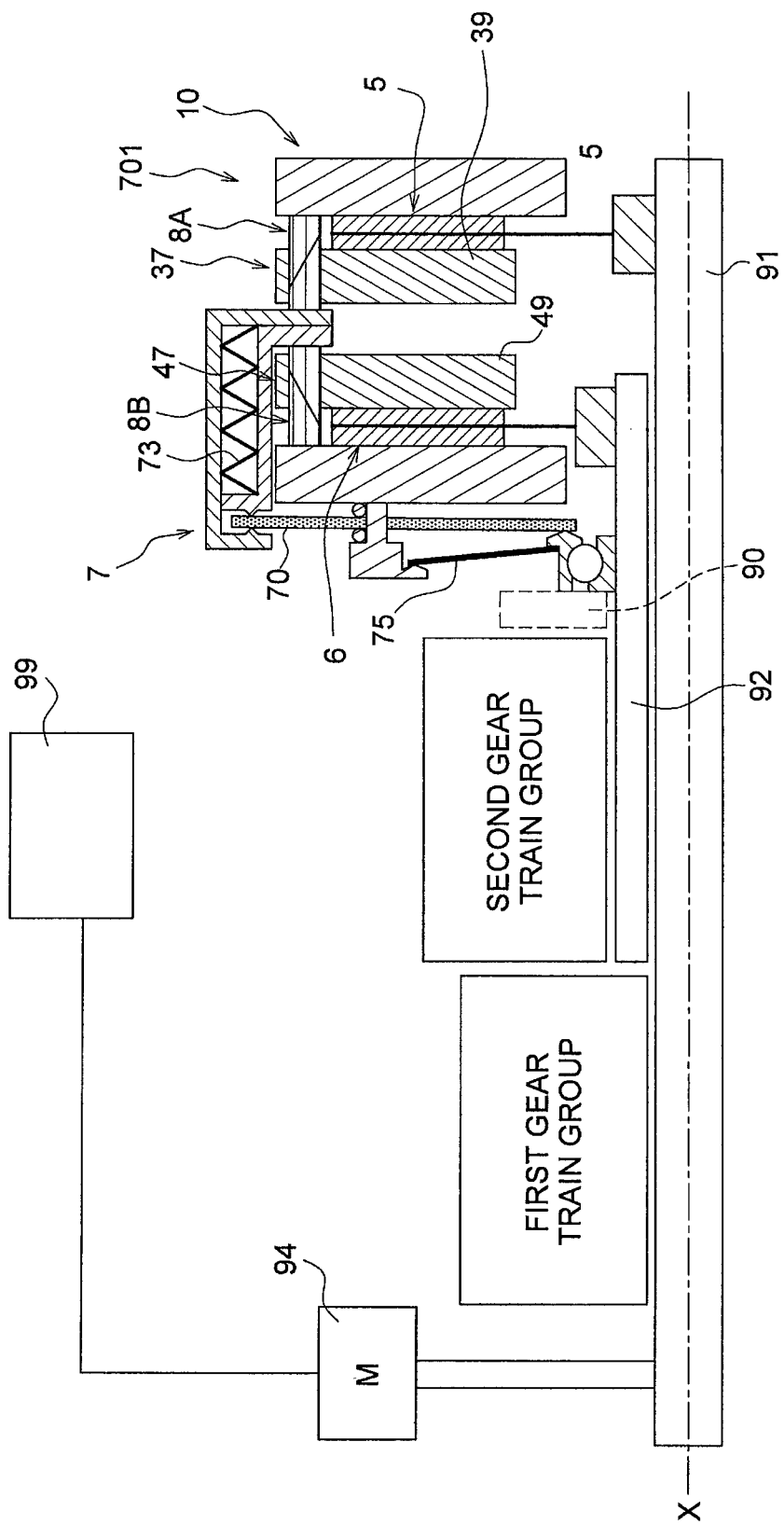
FIG. 14 is a cross-sectional view of a clutch device (an eighth exemplary embodiment).

Specifically, as illustrated in FIG. 14, a clutch device 701 includes the input rotor 10, the first pressure plate assembly 37, the second pressure plate assembly 47, the first clutch disc assembly 5, the second clutch disc assembly 6, the first abrasion tracking mechanism 8A, the second abrasion tracking mechanism 8B, the drive mechanism 7, an auxiliary motor 94 and a motor control unit 99. The elements other than the auxiliary motor 94 and the motor control unit 99 are the same as those of the aforementioned clutch device 1.

Figure 15:
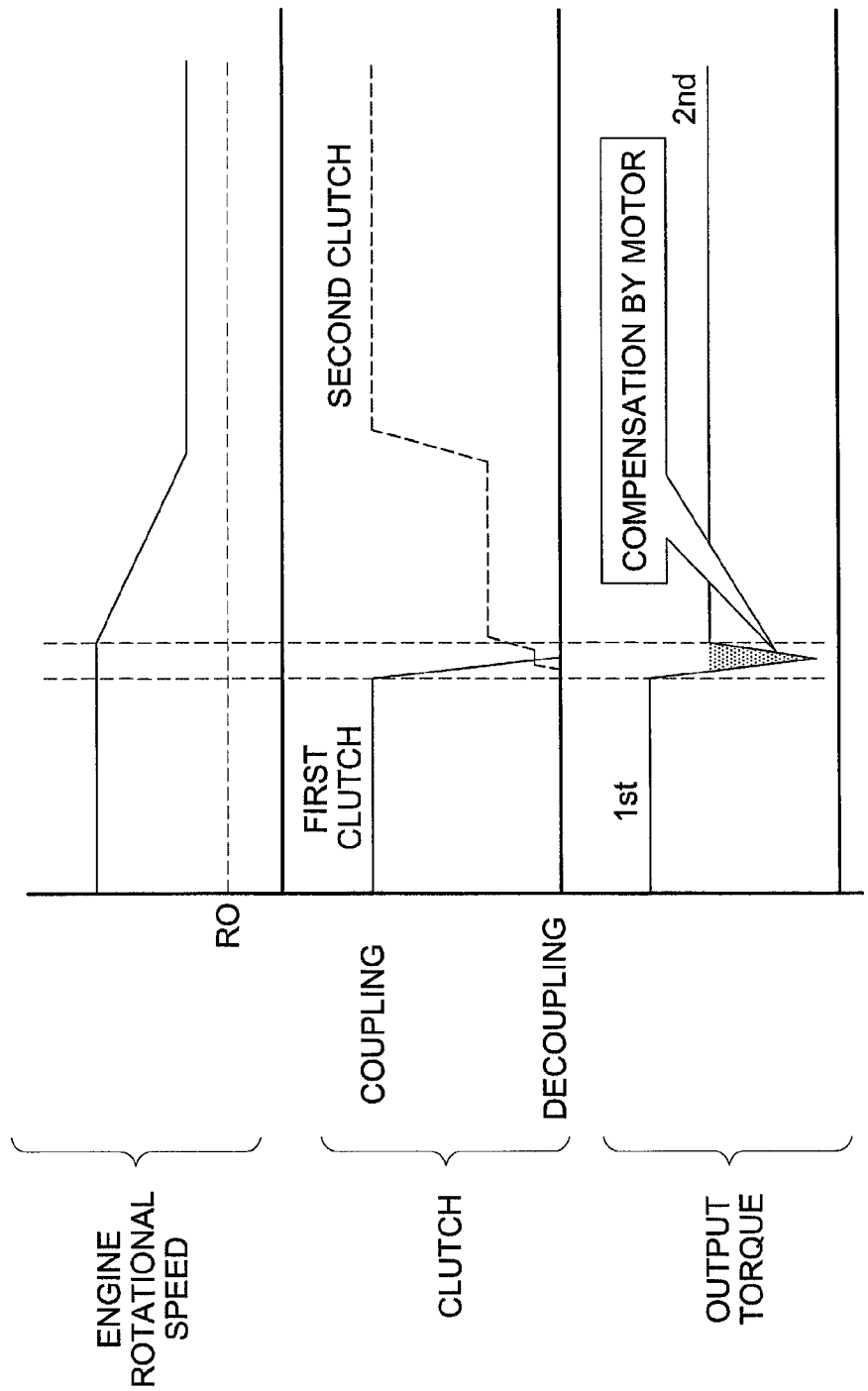
FIG. 15 is a diagram of explaining an action of an auxiliary motor (the eighth exemplary embodiment).

As illustrated in FIG. 15, the auxiliary motor 94 (an exemplary (assist driving part) is configured to input power into the first input shaft 91 on an as-needed basis. The motor control unit 99 controls the auxiliary motor 94. The motor control unit 99 is configured to drive the auxiliary motor 94 when a pre-switching gear stage is the first speed stage and simultaneously the engine rotational speed exceeds a reference rotational speed R0 in switching the power transmission line from the first clutch C1 to the second clutch C2. The start timing of driving and the end timing of driving are determined based on the driving amount of the actuator 90. Specifically, the actuator 90 can detect the axial position of the release bearing 95 and the positional information of the release bearing 95 is configured to be inputted into the motor control unit 99 from the actuator 90 at predetermined cycles. A term in which transmission power is reduced can be specified by the positional information of the release bearing 95.

Thus, torque transmission prevention can be more effectively prevented by the auxiliary motor 94 and the motor control unit 99.

Figure 16:
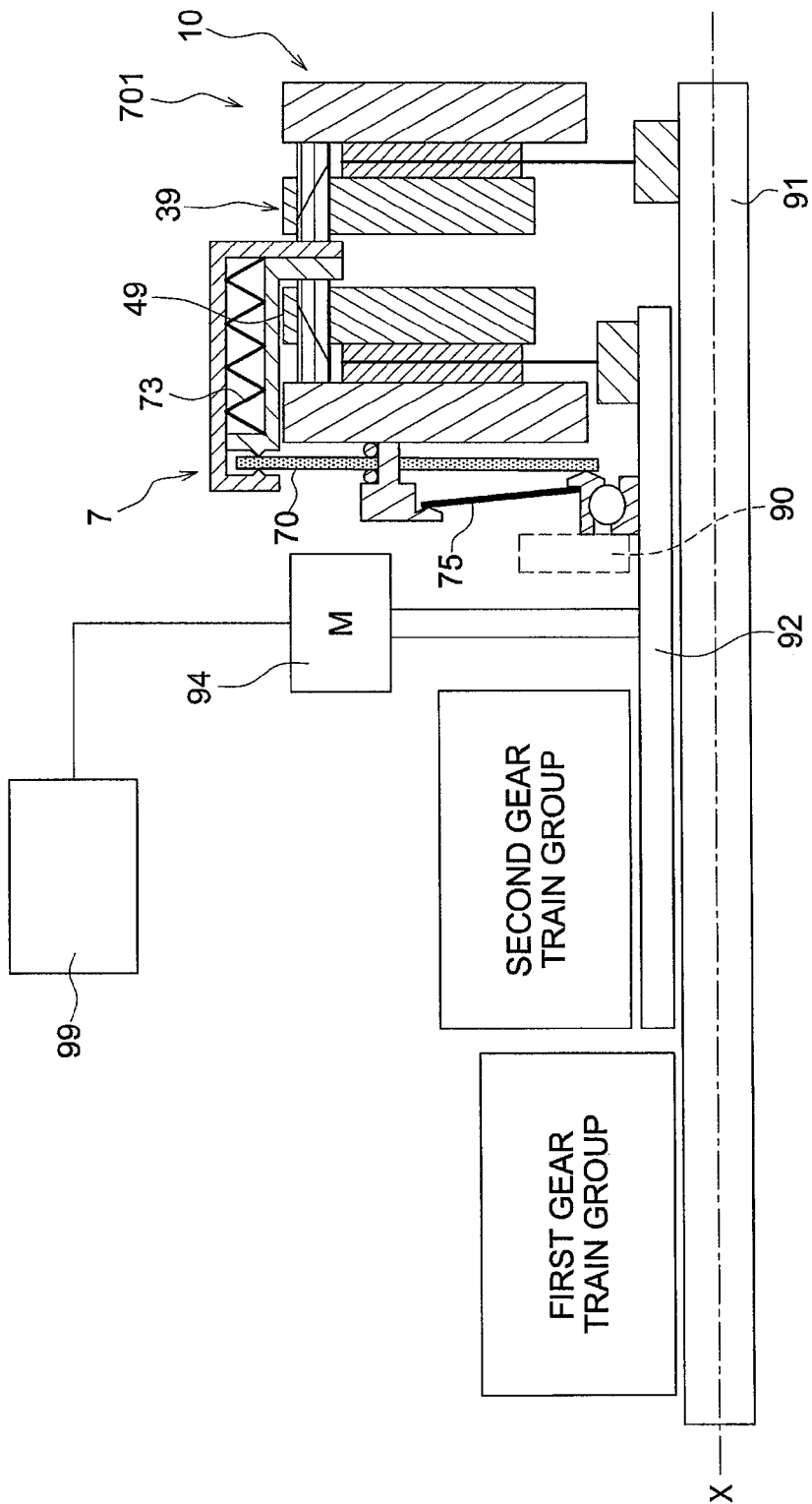
FIG. 16 is a cross-sectional view of the clutch device (the eighth exemplary embodiment).

It should be noted that the auxiliary motor 94 is coupled to the first input shaft 91 in the clutch device 701 illustrated in FIG. 14. However, as illustrated in FIG. 16, the auxiliary motor 94 can be coupled to the second input shaft 92. Further, auxiliary motors can be respectively coupled to the first input shaft 91 and the second input shaft 92.

Ninth Exemplary Embodiment

In the aforementioned exemplary embodiments, the clutch device includes the intermediate springs for inhibiting torque transmission prevention of the clutch. However, even without the intermediate springs, clutch driving force can be prevented from being transmitted to the engine, while reduction in size of the device can be achieved.

It should be noted that in the following explanation, the same reference signs are assigned to elements having substantially the same functions as those in the aforementioned exemplary embodiment and detailed explanation thereof will be hereinafter omitted.

Figure 17:
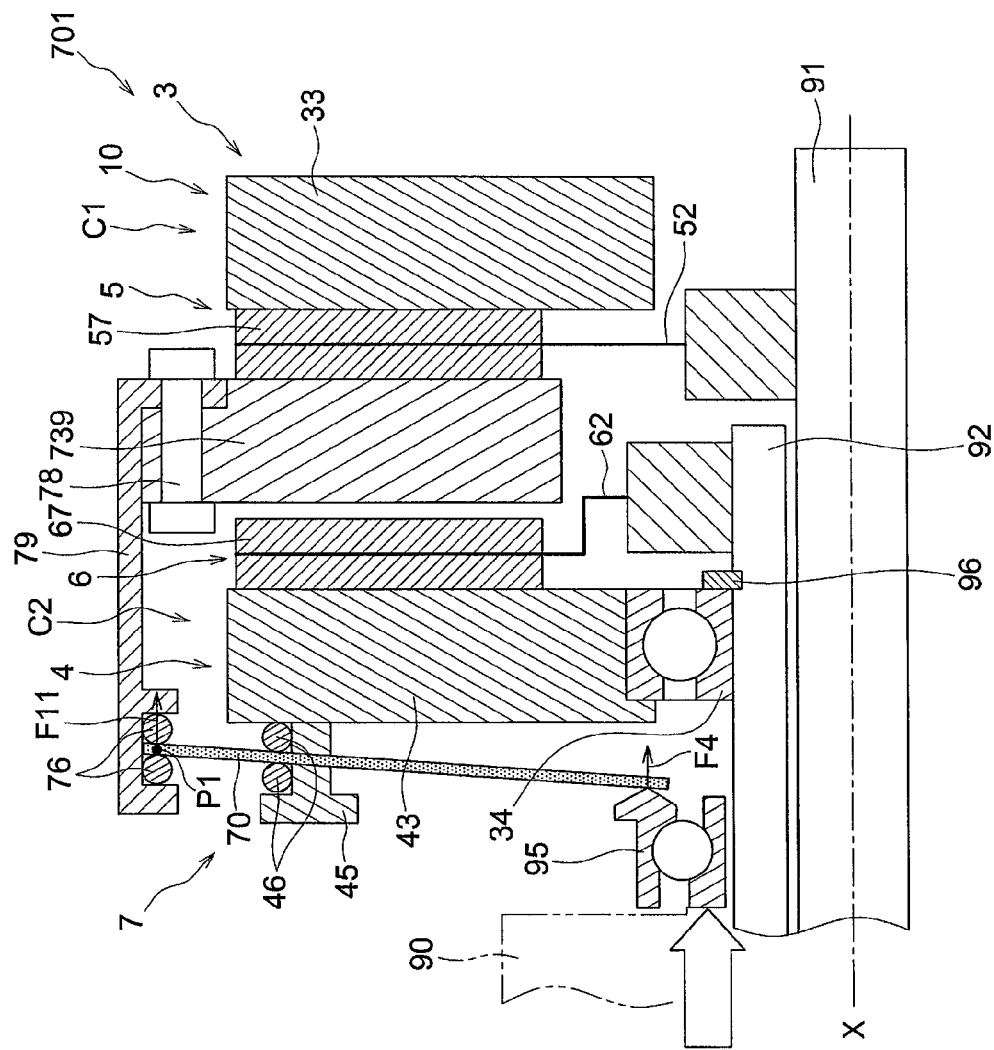
FIG. 17 is a cross-sectional view of a clutch device (a ninth exemplary embodiment).

As illustrated in FIG. 17, the clutch device 701 according to a ninth exemplary embodiment includes the input rotor 10, a pressure plate 739, the first clutch disc assembly 5, the second clutch disc assembly 6 and the drive mechanism 7. The first clutch C1 is formed by the input rotor 10 (in more detail, the first flywheel 3), the pressure plate 739 and the first clutch disc assembly 5. The second clutch C2 is formed by the input rotor 10 (in more detail, the second flywheel 4), the pressure plate 739 and the second clutch disc assembly 6. The first clutch C1 is a mechanism for transmitting power to the first input shaft 91 and is a clutch of a normal close type in the present exemplary embodiment. On the other hand, the second clutch C2 is a mechanism for transmitting power to the second input shaft 92 and is a clutch of a normal open type in the present exemplary embodiment. For example, the first clutch C1 is configured to transmit power at the first, third and fifth speed stages, whereas the second clutch C2 is configured to transmit power at the second and fourth speed stages. As described below, the first clutch C1 and the second clutch C2 share the drive mechanism 7. Therefore, reduction in size of the clutch device 701 can be achieved.

Input Rotor 10

The input rotor 10 is a member to which power is transmitted from the engine. The input rotor 10 is coupled to the crankshaft (not illustrated in the figure) through the flexible plate (not illustrated in the figure) and the damper (not illustrated in the figure). The input rotor 10 is rotated about the rotary axis X. The input rotor 10 mainly includes the first flywheel 3 and the second flywheel 4.

(1) First Flywheel 3

The first flywheel 3 has the first disc portion 33 having an annular shape. The first flywheel 3 is fixed to and unitarily rotated with the second flywheel 4.

(2) Second Flywheel 4

The second flywheel 4 has the second disc portion 43 having an annular shape. The second disc portion 43 is disposed axially away from the first disc portion 33 at a space. The second flywheel 4 is fixed to and unitarily rotated with the first flywheel 3. The second flywheel 4 is rotatably supported by the second input shaft 92 through the bearing 34. The bearing 34 is fixed to the inner peripheral part of the second flywheel 4. The bearing 34 also supports the first flywheel 3 in a rotatable state through the second flywheel 4. The bearing 34 is restricted from moving towards the engine by the snap ring 96 attached to the second input shaft 92. Further, the bearing 34 is fixed to the inner peripheral part of the second flywheel 4 for preventing the second flywheel 4 from moving towards the engine with respect to the bearing 34. Accordingly, the input rotor 10 is restricted from moving towards the engine with respect to the second input shaft 92. The bearing 34 and the snap ring 96 receive clutch driving force in switching the second clutch C2 into the engaged state.

Pressure Plate 739

The pressure plate 739 is an annular member for pressing the first clutch disc assembly 5 onto the first flywheel 3 and for pressing the second clutch disc assembly 6 onto the second flywheel 4. The pressure plate 739 is disposed axially between the first disc portion 33 and the second disc portion 43. The pressure plate 739 is disposed while being unitarily rotatable with and axially movable with respect to the input rotor 10. Specifically, the pressure plate 739 is coupled to the input rotor 10 by the first strap plate (not illustrated in the figure). A coupling plate 79 is fixed to the outer peripheral part of the pressure plate 739 by rivets 78.

First Clutch Disc Assembly 5

The first clutch disc assembly 5 is an assembly for transmitting power from the input rotor 10 to the first input shaft

91. The first clutch disc assembly 5 is coupled to the first input shaft 91 while being unitarily rotatable therewith and axially movable with respect thereto. The first clutch disc assembly 5 includes the first friction portion 57 and the first input member 52.

The first friction portion 57 is disposed axially between the first disc portion 33 and the pressure plate 739. The first friction portion 57 is provided slidably with the first disc portion 33 and the pressure plate 739. The first friction portion 57 includes the cushioning plate (not illustrated in the figure). Therefore, when the first friction portion 57 is interposed between the pressure plate 739 and the first disc portion 33, the cushioning plate is axially compressed and cushion force acts on the pressure plate 739 and the first disc portion 33.

The first input member 52 is a member to which power is transmitted from the first friction portion 57. The first input member 52 is coupled to the first friction portion 57. The first input member 52 is coupled to the first input shaft 91.

Second Clutch Disc Assembly 6

The second clutch disc assembly 6 is an assembly for transmitting power from the input rotor 10 to the second input shaft 92. The second clutch disc assembly 6 is coupled to the second input shaft 92 while being unitarily rotatable therewith and axially movable with respect thereto. The second clutch disc assembly 6 includes the second friction portion 67 and the second input member 62.

The second friction portion 67 is disposed axially between the second disc portion 43 and the pressure plate 739. The second friction portion 67 is provided slidably with the input rotor 10 and the pressure plate 739. The second friction portion 67 includes the cushioning plate (not illustrated in the figure). Therefore, when the second friction portion 67 is interposed between the pressure plate 739 and the second disc portion 43, the cushioning plate is axially compressed and cushion force acts on the pressure plate 739 and the second disc portion 43.

The second input member 62 is a member to which power is transmitted from the second friction portion 67. The second input member 62 is coupled to the second friction portion 67. The second input member 62 is coupled to the second input shaft 92.

Drive Mechanism 7

The drive mechanism 7 is a mechanism for manipulating transmission of power of the first clutch C1 and the second clutch C2. The drive mechanism 7 is configured to transmit axial pressing force to the pressure plate 739. The first clutch C1 and the second clutch C2 share the single drive mechanism 7. Specifically, the drive mechanism 7 includes the diaphragm spring 70 and the coupling plate 79.

Only one diaphragm spring 70 (an exemplary lever member) is provided for the clutch device 701. The diaphragm spring 70 is a member shared by the first clutch C1 and the second clutch C2. The diaphragm spring 70 is disposed in a preliminarily compressed state for applying elastic force to the first clutch C1. Specifically, the diaphragm spring 70 is supported by the second flywheel 4 while being elastically deformable. The diaphragm spring 70 applies axial pressing force to the pressure plate 739 through the drive mechanism 7. The plural support members 45 are fixed to the second flywheel 4. The two wire rings 46 are attached to the plural support members 45. The diaphragm spring 70 is supported by the support members 45 through the two wire rings 46 while being elastically deformable.

The coupling plate 79 is fixed to the outer peripheral part of the pressure plate 739 by the rivets 78 for transmitting the elastic force of the diaphragm spring 70 or the driving force of the actuator. Two wire rings 76 are attached to the coupling plate 79. The outer peripheral part of the diaphragm spring 70 is axially interposed between the two wire rings 76. The elastic force of the diaphragm spring 70 is transmitted to the pressure plate 739 through the wire rings 76 and the coupling plate 79.

While driving force is not being applied to the diaphragm spring 70, the first clutch disc assembly 5 is interposed between the first disc portion 33 and the pressure plate 739 by the pressing force of the diaphragm spring 70. In other words, the first clutch C1 is of a normal close type.

Action of Clutch Device 701

As illustrated in FIG. 17, while axial driving force is not acting on the diaphragm spring 70 from the actuator 90, the elastic force of the diaphragm spring 70 is transmitted to the pressure plate 739 through the coupling plate 79. As a result, power is transmitted to the transmission from the engine through the first clutch C1.

When the power transmission line is switched from the first clutch C1 to the second clutch C2, the first clutch C1 and the second clutch C2 are driven by the shared diaphragm spring 70. Specifically, when driving force is inputted into the inner peripheral part of the diaphragm spring 70 from the release bearing 95 while the first clutch C1 is set in the engaged state, the inner peripheral part of the diaphragm spring 70 is moved towards the engine, and accordingly, the outer peripheral part of the diaphragm spring 70 (the point-of-action P1) is moved towards the transmission. As a result, the elastic force, while is being transmitted to the pressure plate 739, is gradually reduced and the transmission power in the first clutch C1 is gradually reduced.

When the point-of-action P1 of the diaphragm spring 70 is moved towards the transmission, the coupling plate 79 and the pressure plate 739 are also moved towards the transmission. When the pressure plate 739 is moved towards the transmission, the engaged state of the first clutch C1 is gradually released and the state of the second clutch C2 is gradually transitioned to the engaged state.

At this time, the clutch driving force F4 acts on the inner peripheral part of the diaphragm spring 70 from the release bearing 95. However, the input rotor 10 is restricted from axially moving towards the engine by the bearing 34 and the snap ring 96. The second input shaft 92 is thereby supposed to receive the clutch driving force F4 through the snap ring 96. Therefore, the clutch driving force F4 can be prevented from being transmitted to the engine.

Further, the first clutch C1 and the second clutch C2 are driven by the single diaphragm spring 70. Therefore, it is required to provide only one actuator 90. Accordingly, reduction in size of the clutch device 701 can be achieved.

Based on the above, according to the present clutch device 701, the clutch driving force can be prevented from being transmitted to the engine, while reduction in size of the device can be achieved.

Tenth Exemplary Embodiment

In the aforementioned first to ninth exemplary embodiments, the input rotor 10 is restricted from axially moving by the second input shaft 92. However, the input rotor 10 can be restricted from axially moving by the first input shaft 91.

It should be noted that, similarly in the following explanation, the same reference signs are assigned to elements having substantially the same functions as those in the aforementioned exemplary embodiments and detailed explanation thereof will be hereinafter omitted.

Figure 18:
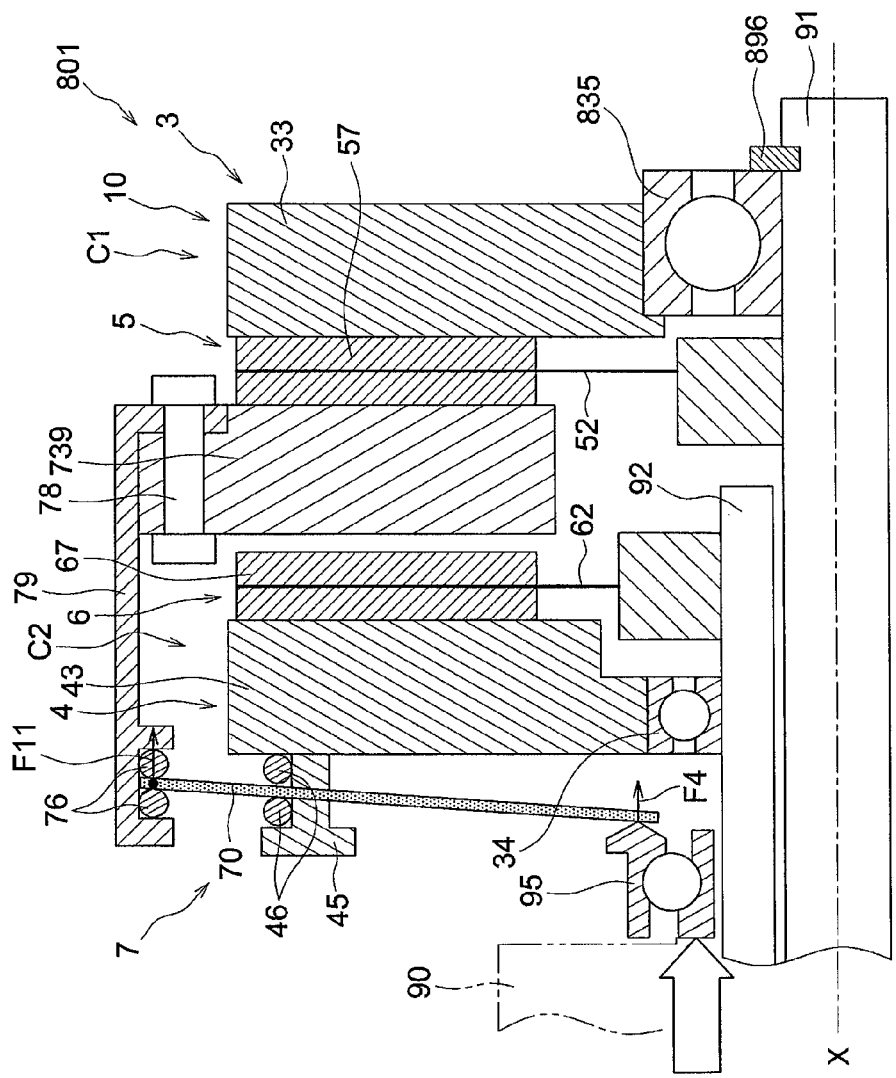
FIG. 18 is a cross-sectional view of a clutch device (a tenth exemplary embodiment).

A clutch device 801 according to a tenth exemplary embodiment is different from the aforementioned clutch device 1 in that the input rotor 10 is restricted from axially moving by the first input shaft 91. Specifically, as illustrated in FIG. 18, the clutch device 801 includes the input rotor 10, the pressure plate 739, the first clutch disc assembly 5, the second clutch disc assembly 6 and the drive mechanism 7.

The input rotor 10 is a member to which power is transmitted from the engine. The input rotor 10 is coupled to the crankshaft (not illustrated in the figure) through the flexible plate (not illustrated in the figure) and the damper (not illustrated in the figure). The input rotor 10 is rotated about the rotary axis X. The input rotor 10 mainly includes the first flywheel 3 and the second flywheel 4.

The first flywheel 3 has the first disc portion 33 having an annular shape. The first flywheel 3 is fixed to and unitarily rotated with the second flywheel 4. The first flywheel 3 is rotatably supported by the first input shaft 91 through a bearing 835. The bearing 835 is fixed to the inner peripheral part of the first flywheel 3. The bearing 835 is restricted from moving towards the engine by a snap ring 896 attached to the first input shaft 91. Further, the bearing 835 is fixed to the inner peripheral part of the first flywheel 3 for preventing the first flywheel 3 from moving towards the engine with respect to the bearing 835. Accordingly, the input rotor 10 is restricted from moving towards the engine with respect to the first input shaft 91. The bearing 835 and the snap ring 896 receive clutch driving force in switching the second clutch C2 into the engaged state.

The second flywheel 4 has the second disc portion 43 having an annular shape. The second disc portion 43 is disposed axially away from the first disc portion 33 at a space. The second flywheel 4 is fixed to and unitarily rotated with the first flywheel 3. The second flywheel 4 is rotatably supported by the second input shaft 92 through the bearing 34. The bearing 34 is fixed to the inner peripheral part of the second flywheel 4.

When the second clutch C2 is switched into the engaged state, the clutch driving force F4 acts on the inner peripheral part of the diaphragm spring 70 from the release bearing 95. However, the input rotor 10 is restricted from axially moving towards the engine by the bearing 835 and the snap ring 896. Therefore, the first input shaft 91 is supposed to receive the clutch driving force F4 through the snap ring 896. Therefore, the clutch driving force F4 can be prevented from being transmitted to the engine.

Further, the first clutch C1 and the second clutch C2 are driven by the single diaphragm spring 70. Therefore, it is required to provide only one actuator 90. Accordingly, reduction in size of the clutch device 801 can be achieved.

Based on the above, even with the present clutch device 801, the clutch driving force can be prevented from being transmitted to the engine, while reduction in size of the device can be achieved.

Eleventh Exemplary Embodiment

In the aforementioned eighth and ninth exemplary embodiments, the first clutch C1 is a clutch of a normal close type. However, both of the first clutch C1 and the second clutch C2 can be clutches of a normal open type.

Figure 19:
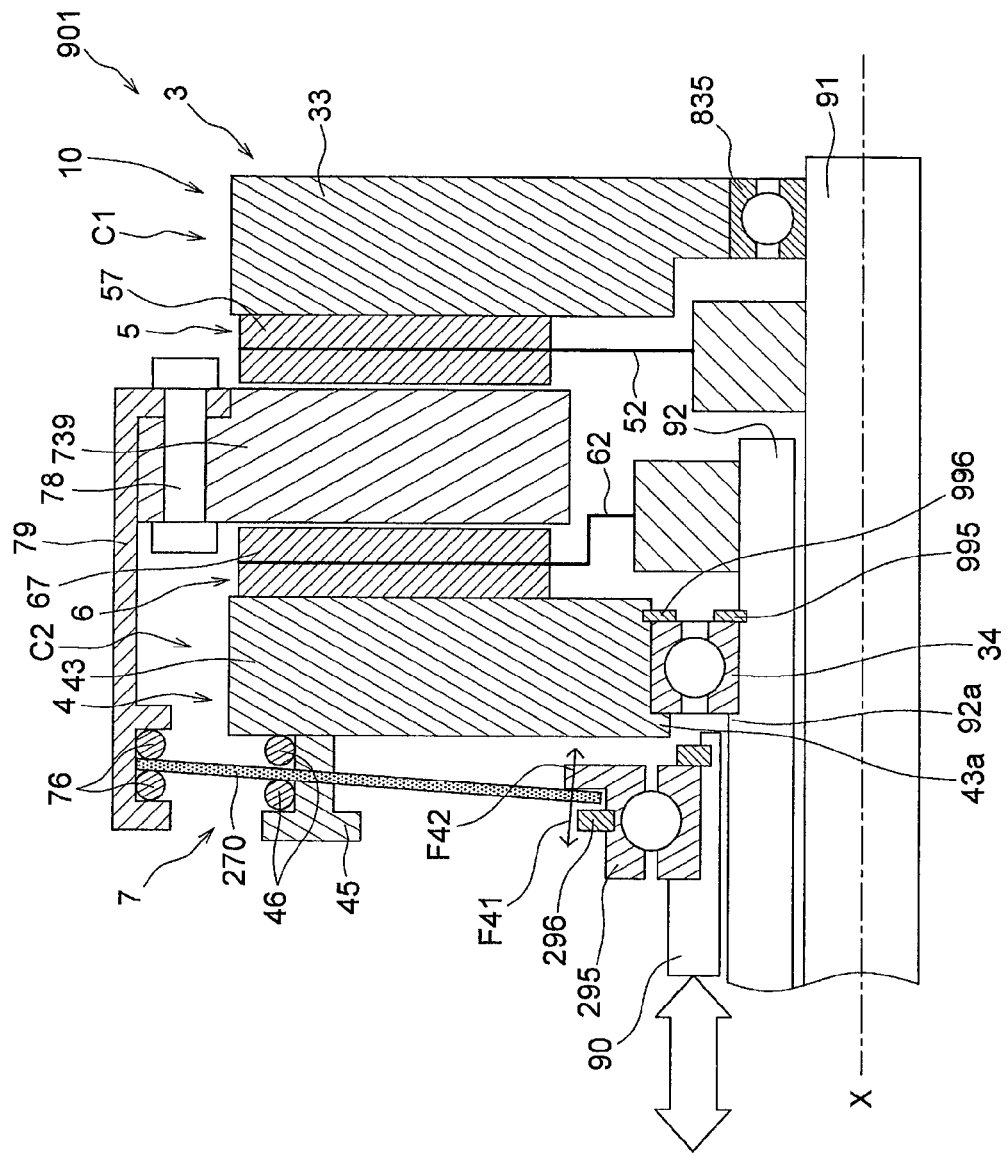
FIG. 19 is a cross-sectional view of a clutch device (an eleventh exemplary embodiment).

As illustrated in FIG. 19, a clutch device 901 according to an eleventh exemplary embodiment includes the input rotor 10, the pressure plate 739, the first clutch disc assembly 5, the second clutch disc assembly 6 and the drive mechanism 7.

The first flywheel 3 of the input rotor 10 is rotatably supported by the first input shaft 91 through the bearing 835. The bearing 835 is fixed to the inner peripheral part of the first flywheel 3.

The second flywheel 4 of the input rotor 10 is rotatably supported by the second input shaft 92 through the bearing 34. The bearing 34 is fixed to the inner peripheral part of the second flywheel 4. The bearing 34 is restricted from moving towards the engine by a snap ring 995 attached to the second input shaft 92. Further, the second input shaft 92 has a restricting portion 92a. The restricting portion 92a restricts the bearing 34 from moving towards the transmission with respect to the second input shaft 92 while axially making contact with the bearing 34. The bearing 34 is interposed axially between the restricting portion 92a and the snap ring 995. In other words, the bearing 34 is restricted from moving in both axial directions with respect to the second input shaft 92.

Further, the bearing 34 is fixed to the inner peripheral part of the second flywheel 4 for preventing the second flywheel 4 from moving in both axial directions with respect to the bearing 34. Specifically, the restricting portion 43a is formed in the inner peripheral part of the second flywheel 4. The restricting portion 43a restricts the second flywheel 4 from moving towards the engine with respect to the bearing 34 while axially making contact with the bearing 34. Further, a snap ring 996 is attached to the inner peripheral part of the second flywheel 4. The bearing 34 is interposed axially between the restricting portion 43a and the snap ring 996. In other words, the second flywheel 4 is restricted from moving in both axial directions with respect to the bearing 34.

With the aforementioned structure, the input rotor 10 is restricted from moving in both axial directions with respect to the second input shaft 92. The bearing 34 and the snap rings 995 and 996 receive clutch driving force in switching the first clutch C1 into the engaged state, and further receive clutch driving force in switching the second clutch C2 into the engaged state.

Only one drive lever 270 (an exemplary lever member) is provided for the clutch device 901. The drive lever 270 is a member shared by the first clutch C1 and the second clutch C2. Unlike the aforementioned eighth and tenth exemplary embodiments, the drive lever 270 is a member with low stiffness and thereby cannot generate elastic force enough to press the first clutch C1 and the second clutch C2. However, the drive lever 270 can transmit driving force from the actuator 90 to the pressure plate 739. The drive lever 270 is supported by the second flywheel 4 while being elastically deformable. The plural support members 45 are fixed to the second flywheel 4. The two wire rings 46 are attached to the plural support members 45. The drive lever 270 is supported by the support members 45 through the two wire rings 46 while being elastically deformable.

The snap ring 296 is attached to the release bearing 295. The inner peripheral part of the drive lever 270 is interposed between the release bearing 295 and the snap ring 296. The release bearing 295 is fixed to an end of the actuator 90. The actuator 90 is disposed while being allowed to apply driving force to the drive lever 270 in both axial directions. Thus, driving force can be transmitted from the actuator 90 to the drive lever 270 through the release bearing 295 in both axial directions (towards the engine and the transmission).

When the first clutch C1 is switched into the engaged state, the lever driving force F41 acts on the inner peripheral part of the drive lever 270 from the release bearing 295. However, the input rotor 10 is restricted from axially moving towards the transmission by the second input shaft 92. Therefore, the second input shaft 92 is supposed to receive the lever driving force F41. Accordingly, the lever driving force F41 can be prevented from being transmitted to the engine.

Further, when the second clutch C2 is switched into the engaged state, the assist force F42 acts on the inner peripheral part of the drive lever 270 from the release bearing 295. However, the input rotor 10 is restricted from axially moving towards the engine by the second input shaft 92. Therefore, the second input shaft 92 is supposed to receive the assist force F42. Accordingly, the assist force F42 can be prevented from being transmitted to the engine.

Further, the first clutch C1 and the second clutch C2 are driven by the single drive lever 270. Therefore, it is required to provide only one actuator 90. Accordingly, reduction in size of the clutch device 901 can be achieved.

Based on the above, even with the present clutch device 901, the clutch driving force can be prevented from being transmitted to the engine, while reduction in size of the device can be achieved.

Twelfth Exemplary Embodiment

In the aforementioned eleventh exemplary embodiment, the input rotor 10 is restricted from axially moving by the second input shaft 92. However, the input rotor 10 can be restricted from axially moving by the first input shaft 91.

Figure 20:
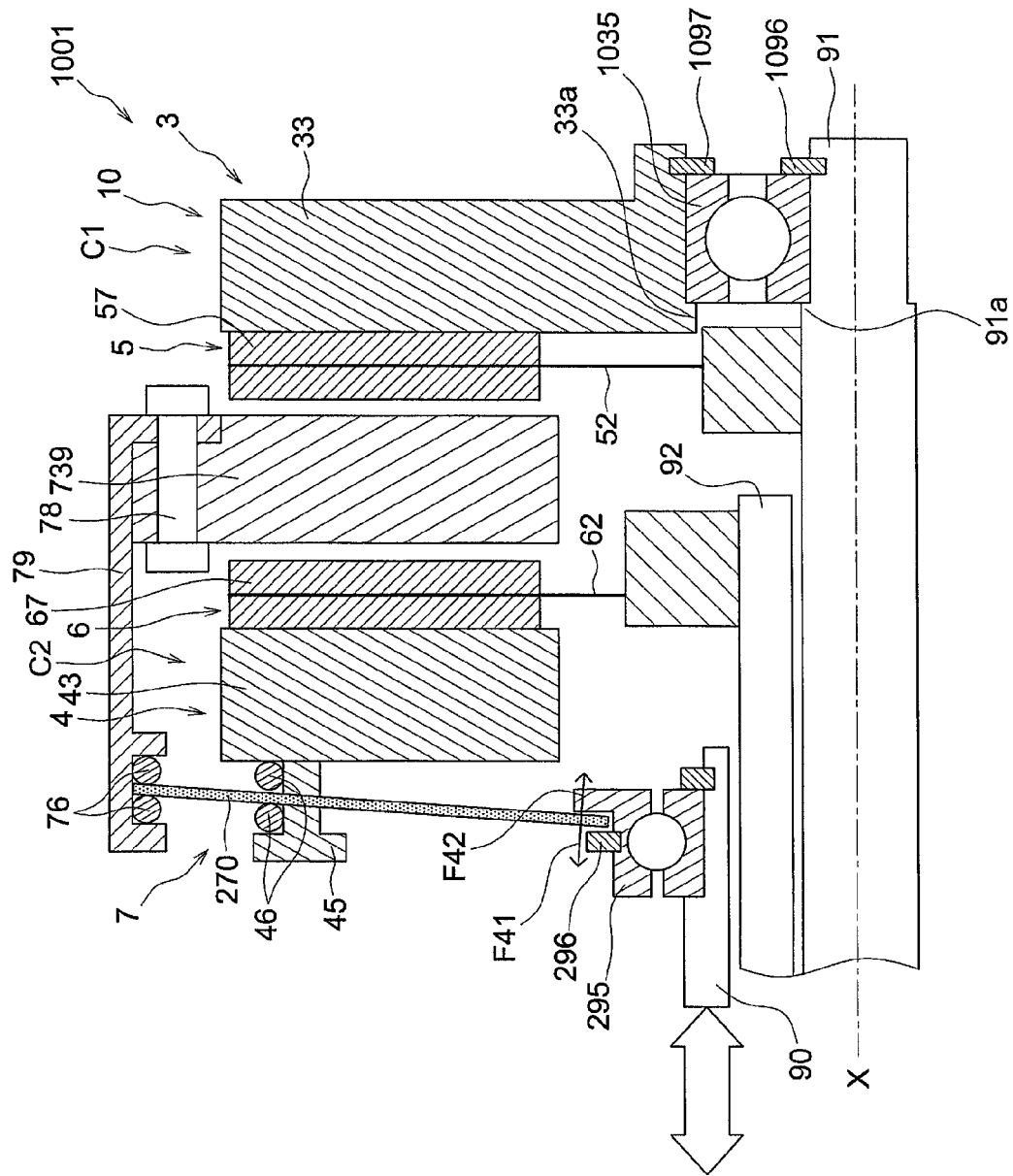
FIG. 20 is a cross-sectional view of a clutch device (a twelfth exemplary embodiment).

As illustrated in FIG. 20, a clutch device 1001 according to a twelfth exemplary embodiment includes the input rotor 10, the pressure plate 739, the first clutch disc assembly 5, the second clutch disc assembly 6 and the drive mechanism 7.

The first flywheel 3 of the input rotor 10 has the first disc portion 33 having an annular shape. The first flywheel 3 is fixed to and unitarily rotated with the second flywheel 4.

The first flywheel 3 is rotatably supported by the first input shaft 91 through a bearing 1035. The bearing 1035 is fixed to the inner peripheral part of the first flywheel 3. The bearing 1035 is restricted from moving towards the engine by a snap ring 1096 attached to the first input shaft 91. Further, the first input shaft 91 has a restriction portion 91a. The restriction portion 91a restricts the bearing 1035 from moving towards the transmission with respect to the first input shaft 91 while axially making contact with the bearing 1035. The bearing 1035 is interposed axially between the restriction portion 91a and the snap ring 1096. In other words, the bearing 1035 is restricted from moving in both axial directions with respect to the first input shaft 91.

Further, the bearing 1035 is fixed to the inner peripheral part of the first flywheel 3 for preventing the first flywheel 3 from moving in both axial directions with respect to the bearing 1035. Specifically, a restriction portion 33a is formed in the inner peripheral part of the first flywheel 3. The restriction portion 33a restricts the first flywheel 3 from moving towards the engine with respect to the bearing 1035 while axially making contact with the bearing 1035. Further, a snap ring 1097 is attached to the inner peripheral part of the first flywheel 3. The bearing 1035 is interposed axially between the restriction portion 33a and the snap ring 1097. In other words, the first flywheel 3 is restricted from moving in both axial directions with respect to the bearing 1035.

With the aforementioned structures, the input rotor 10 is restricted from moving in both axial directions with respect to the first input shaft 91. The bearing 1035, the snap rings 1096 and 1097 receive clutch driving force in switching the first clutch C1 into the engaged state, and further, receive clutch driving force in switching the second clutch C2 into the engaged state.

The second flywheel 4 has the second disc portion 43 having an annular shape. The second disc portion 43 is disposed axially away from the first disc portion 33 at a space. The second flywheel 4 is fixed to and unitarily rotated with the first flywheel 3. The bearing 1035 supports the second flywheel 4 in a rotatable state through the first flywheel 3. In other words, the input rotor 10 is rotatably supported by the first input shaft 91 through the bearing 1035.

When the first clutch C1 is switched into the engaged state, the lever driving force F41 acts on the inner peripheral part of the drive lever 270 from the release bearing 295. However, the input rotor 10 is restricted from axially moving towards the transmission by the second input shaft 92. Therefore, the first input shaft 91 is supposed to receive the lever driving force F41. Accordingly, the lever driving force F41 can be prevented from being transmitted to the engine.

Further, when the second clutch C2 is switched into the engaged state, the assist force F42 acts on the inner peripheral part of the drive lever 270 from the release bearing 295. However, the input rotor 10 is restricted from axially moving towards the engine by the first input shaft 91. Therefore, the second input shaft 92 is supposed to receive the assist force F42. Accordingly, the assist force F42 can be prevented from being transmitted to the engine.

Further, the first clutch C1 and the second clutch C2 are driven by the single drive lever 270. Therefore, it is required to provide only one actuator 90. Accordingly, reduction in size of the clutch device 1001 can be achieved.

Based on the above, even with the present clutch device 1001, the clutch driving force can be prevented from being transmitted to the engine while reduction in size of the device can be achieved.

Thirteenth Exemplary Embodiment

In the aforementioned ninth to twelfth exemplary embodiments, the input rotor 10 includes the first flywheel 3 and the second flywheel 4. However, the input rotor 10 can be formed by a single flywheel. Further, in accordance, the pressure plate 739 can be formed by two flywheels.

Figure 21:
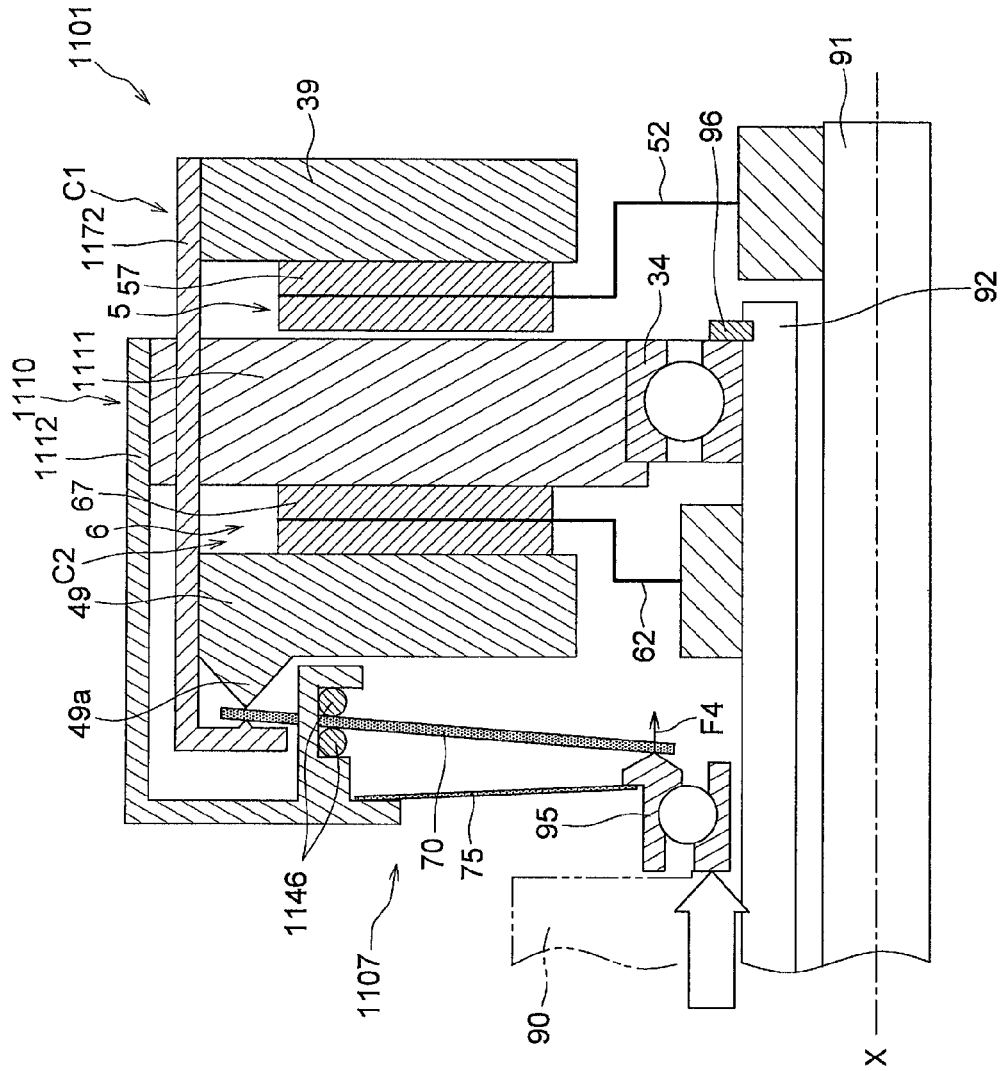
FIG. 21 is a cross-sectional view of a clutch device (a thirteenth exemplary embodiment).

For example, as illustrated in FIG. 21, a clutch device 1101 includes an input rotor 1110, the first pressure plate 39, the second pressure plate 49, the first clutch disc assembly 5, the second clutch disc assembly 6 and a drive mechanism 1107. The first clutch C1 is formed by the input rotor 1110, the first pressure plate 39 and the first clutch disc assembly 5. The second clutch C2 is formed by the input rotor 1110, the second pressure plate 49 and the second clutch disc assembly 6. The first clutch C1 and the second clutch C2 share the drive mechanism 1107. The first clutch C1 is a mechanism for transmitting power to the first input shaft 91 and is a clutch of a normal open type in the present exemplary embodiment. On the other hand, the second clutch C2 is a mechanism for transmitting power to the second input shaft 92 and is a clutch of a normal close type in the present exemplary embodiment. For example, the first clutch C1 is configured to transmit power at the first, third and fifth speed stages, whereas the second clutch C2 is configured to transmit power at the second and fourth speed stages.

Input Rotor 1110

The input rotor 1110 is a member to which power is transmitted from the engine. The input rotor 1110 is coupled to the crankshaft (not illustrated in the figure) through the flexible plate (not illustrated in the figure). The input rotor 1110 is rotated about the rotary axis X. The input rotor 1110 mainly includes a flywheel 1111 and a support member 1112.

The flywheel 1111 is disposed between the first pressure plate 39 and the second pressure plate 49 (in more detail, between the first clutch disc assembly 5 and the second clutch disc assembly 6), while being rotatably supported by the second input shaft 92 through the bearing 34. The bearing 34 is restricted from moving towards the engine by the snap ring 96 attached to the second input shaft 92. Accordingly, the second flywheel 4 is restricted from moving towards the engine with respect to the second input shaft 92. The bearing 34 and the snap ring 96 receive the clutch driving force F4 of the actuator 90 in switching the first clutch C1 into the release state and that in switching the second clutch C2 into the engaged state.

The support member 1112 is a roughly annular member supporting the diaphragm spring 70 and the assist spring 75. The support member 1112 is fixed to the outer peripheral part of the flywheel 1111.

First Pressure Plate 39

The first pressure plate 39 is an annular member disposed on the engine side of the flywheel 1111. The first pressure plate 39 is coupled to the flywheel 1111 through the first strap plate (not illustrated in the figure) while being unitarily rotatable with and axially movable with respect to the flywheel 1111. The first friction portion 57 of the first clutch disc assembly 5 is disposed between the first pressure plate 39 and the flywheel 1111.

Second Pressure Plate 49

The second pressure plate 49 is an annular member disposed on the transmission side of the flywheel 1111. The second pressure plate 49 is coupled to the flywheel 1111 through the second strap plate (not illustrated in the figure) while being unitarily rotatable with and axially movable with respect to the flywheel 1111. The second friction portion 67 of the second clutch disc assembly 6 is disposed between the second pressure plate 49 and the flywheel 1111.

The second pressure plate 49 has a support protrusion 49a. The support protrusion 49a makes contact with the outer peripheral part of the diaphragm spring 70. The second pressure plate 49 is constantly pressed towards the engine by the diaphragm spring 70.

Driving Mechanism 1107

The drive mechanism 1107 is a mechanism for manipulating transmission of power of the first clutch C1 and the second clutch C2. The drive mechanism 1107 is configured to transmit axial pressing force to the first pressure plate 39 and the second pressure plate 49. The first clutch C1 and the second clutch C2 share the single drive mechanism 1107. Specifically, the drive mechanism 1107 includes the diaphragm spring 70, the assist spring 75 and an intermediate plate 1172.

Only one diaphragm spring 70 (an exemplary lever member) is provided for the clutch device 1101. The diaphragm spring 70 is a member shared by the first clutch C1 and the second clutch C2. The diaphragm spring 70 is disposed in a preliminarily compressed state for applying elastic force to the first clutch C1. Specifically, the diaphragm spring 70 is supported by the second flywheel 4 while being elastically deformable. The diaphragm spring 70 applies axial pressing force to the second pressure plate 49 through the intermediate plate 1172. Two wire rings 1146 are attached to the support member 1112. The diaphragm spring 70 is supported by the support member 1112 through the two wire rings 1146 while being elastically deformable.

While driving force is not being applied to the diaphragm spring 70, the second clutch disc assembly 6 is interposed between the flywheel 1111 and the second pressure plate 49 by the pressing force of the diaphragm spring 70. In other words, the second clutch C2 is of a normal close type.

The assist spring 75 is provided for reducing driving force in switching the second clutch C2 into the engaged state. The assist spring 75 assists pressing force (second pressing force) to be transmitted to the second clutch C2 through the diaphragm spring 70. Specifically, the assist spring 75 is a cone spring disposed on the transmitted side of the diaphragm spring 70. The assist spring 75 is supported by the support member 1112 fixed to the flywheel 1111 while being elastically deformable. The assist spring 75 applies engine-directional assist force to the inner peripheral part of the diaphragm spring 70. In more detail, the inner peripheral part of the assist spring 75 is supported by the release bearing 95. Accordingly, it is possible to reduce the clutch driving force to be applied to the diaphragm spring 70.

The intermediate plate 1172 is a member for transmitting pressing force (the clutch driving force of the actuator 90) from the diaphragm spring 70 to the first pressure plate 39. The intermediate plate 172 is fixed to the outer peripheral part of the first pressure plate 39. The intermediate plate 1172 makes contact with the outer peripheral part of the diaphragm spring 70. When the outer peripheral part of the diaphragm spring 70 is moved towards the transmission, the intermediate plate 1172 is pressed towards the transmission by the diaphragm spring 70, and in accordance, the first pressure plate 39 is also moved towards the transmission.

When the first clutch C1 is switched into the engaged state, clutch driving force acts on the inner peripheral part of the diaphragm spring 70 from the release bearing 95. However, the input rotor 10 is restricted from axially moving towards the engine by the second input shaft 92. Therefore, the second input shaft 92 is supposed to receive the clutch driving force through the snap ring 96. Therefore, the clutch driving force can be prevented from being transmitted to the engine.

Further, the first clutch C1 and the second clutch C2 are driven by the single diaphragm spring 70. Therefore, it is required to provide only one actuator 90. Accordingly, reduction in size of the clutch device 1101 can be achieved.

Based on the above, even with the present clutch device 1101, the clutch driving force can be prevented from being transmitted to the engine, while reduction in size of the device can be achieved.

Other Exemplary Embodiments

The present invention is not limited to the exemplary embodiments as described above, and a variety of changes or modifications can be made without departing from the scope of the present invention. It should be noted that the same reference signs are assigned to elements having substantially the same functions as those in the aforementioned exemplary embodiments and detailed explanation thereof will be hereinafter omitted.

(1) In the aforementioned exemplary embodiments, the dry clutch device has been exemplified for explaining the clutch device. However, the aforementioned technology can be applied even to a wet clutch device.

(2) In the aforementioned first to eighth exemplary embodiments, the first pressure plate assembly 37 includes the first abrasion tracking mechanism 8A, whereas the second pressure plate assembly 47 includes the second abrasion tracking mechanism 8B. However, the first pressure plate assembly 37 cannot include the first abrasion tracking mechanism 8A, whereas the second pressure plate assembly 47 can not include the second abrasion tracking mechanism 8B.

(3) In the aforementioned seventh exemplary embodiment, the first clutch C1 is of a normal open type, whereas the second clutch C2 is of a normal close type. However, the first clutch C1 can be of a normal close type, whereas the second clutch C2 can be of a normal open type. Alternatively, both of the first clutch C1 and the second clutch C2 can be of a normal open type.

(4) In the aforementioned exemplary embodiments, the diaphragm spring 70, the drive lever 270 and the drive lever 570 have been exemplified for explaining the lever member.

However, the structure of the lever member is not limited to that of the aforementioned exemplary embodiments. For example, the lever member can be formed by a plurality of members.

(5) In the aforementioned exemplary embodiments, the first intermediate plates 71, 171 and 671 have been exemplified for explaining the first intermediate member. However, the structure of the first intermediate member is not limited to that of the aforementioned exemplary embodiments. For example, the first intermediate member can be formed by a plurality of members.

Similarly, in the aforementioned exemplary embodiments, the second intermediate plates 72, 172 and 672 have been exemplified for explaining the second intermediate member. However, the structure of the second intermediate member is not limited to that of the aforementioned exemplary embodiments. For example, the second intermediate member can be formed by a plurality of members.

(6) In the aforementioned exemplary embodiments, the coupling maintaining force of the intermediate member is set to have a magnitude whereby transmission power in the first clutch and that in the second clutch can be roughly equal to creep power. However, the magnitude of the coupling maintaining force of the intermediate member is not limited to this.

(7) In the aforementioned exemplary embodiments, the input rotor is radially supported by the second input shaft. However, the input rotor can be radially supported by the first input shaft. Alternatively, the input rotor can be radially supported by the first and second input shafts.

Further, in the aforementioned exemplary embodiment, the input rotor is restricted from axially moving by the second input shaft. However, the input rotor can be restricted from axially moving by the first input shaft. Alternatively, the input rotor can be restricted from axially moving by the first and second input shafts.

(8) In the explanation of the aforementioned exemplary embodiments, the same reference signs are assigned to elements having substantially the same functions and detailed explanation thereof is omitted.

(9) In the aforementioned third, sixth, eleventh and twelfth exemplary embodiments, the lever member can be a drive lever with low stiffness, or alternatively, a diaphragm spring that can generate pressing force.

The invention claimed is:

1. A clutch device for transmitting a power from an engine to first and second input shafts of a transmission, the clutch device comprising:
   a first clutch being configured to transmit the power from the engine to the first input shaft;
   a second clutch being configured to transmit the power from the engine to the second input shaft;
   a lever member being configured to apply a pressing force to the first and second clutches; and
   an intermediate elastic member being configured to apply a coupling maintaining force to the first and second clutches in order to maintain a minimal power transmitted torque applied to the first and second clutches when the pressing force is not being applied to the first and second clutches, the intermediate elastic member being separately formed from the lever member,
   the minimal power transmitted torque being predetermined,
   the first and second clutches being at a minimal power transmitted stated, when the minimal power transmitted torque is applied thereto.

2. The clutch device recited in claim 1, wherein
   the pressing force includes a first pressing force,
   the lever member is a diaphragm spring being configured to constantly apply the first pressing force to the first clutch,
   the first clutch is a clutch of a normal close type, and
   the second clutch is a clutch of a normal open type.

3. The clutch device recited in claim 2, further comprising
   the pressing force includes a second pressing force,
   an assist elastic member being configured to apply an assist force to be added to the second pressing force, wherein
   the second pressing force being applied to the second clutch through the lever member.

4. The clutch device recited in claim 1, wherein
   the first and second clutches are clutches of a normal open type, and
   the power transmitted state of the first and second clutches are maintained by the coupling maintaining force while the power is not being transmitted to the lever member.

5. The clutch device recited in claim 4, further comprising
   an actuator configured to apply the power to the lever member toward both sides in an axial direction in which the first input shaft extends.

6. The clutch device recited in claim 1, wherein
   the first clutch includes
      an input rotor to which a power is inputted from the engine,
      a first pressure plate assembly being configured to be unitarily rotatable with and axially movable with respect to the input rotor, and
      a first clutch disc assembly being disposed between the input rotor and the first pressure plate assembly, and configured to be coupled to the first input shaft, and
   the second clutch includes
      the input rotor,
      the second pressure plate assembly being configured to be unitarily rotatable with and axially movable with respect to the input rotor, and
      a second clutch disc assembly being disposed between the input rotor and the second pressure plate assembly, and configured to be coupled to the second input shaft.

7. The clutch device recited in claim 6, wherein
   the input rotor is radially being supported by at least one of the first and second input shafts and configured to be restricted from moving in at least one of sides in an axial direction, in which the first input shaft extends, by at least either of the first and second input shafts.

8. The clutch device recited in claim 6, further comprising
   a first intermediate member being configured to transmit the power from the lever member to the first pressure plate assembly, the first intermediate member being configured to be unitarily rotatable with and axially movable with respect to the input rotor; and
   a second intermediate member being configured to transmit the power from the lever member to the second pressure plate assembly, the second intermediate member being configured to be unitarily rotatable with and axially movable with respect to the input rotor,
   wherein the intermediate elastic member is disposed in a preliminarily compressed state between the first intermediate member and the second intermediate member.

9. The clutch device recited in claim 8, wherein
   a part of the second intermediate member is interposed between the first intermediate member and the first pressure plate assembly, when a pressing force is applied to the first clutch from the lever member through the first intermediate member, and a part of the first intermediate member is interposed between the second intermediate member and the second pressure plate assembly, when a pressing force is being applied to the second clutch from the lever member through the second intermediate member.

10. The clutch device recited in claim 7, wherein the intermediate elastic member is disposed in a preliminarily compressed state axially between the first pressure plate assembly and the second pressure plate assembly.

11. The clutch device recited in claim 10, further comprising an intermediate transmission member being configured to transmit the power from the lever member to the first pressure plate assembly and to the second pressure plate assembly, the intermediate transmission member being configured to be unitarily rotatable with and axially movable with respect to the input rotor.

12. The clutch device recited in claim 11, wherein the intermediate transmission member being configured to drive the first pressure plate assembly toward both the sides in the axial direction and drive the second pressure plate assembly toward both the sides in the axial direction.

13. The clutch device recited in claim 1, further comprising a first abrasion tracking mechanism being provided for the first pressure plate assembly in order to reduce variation in a load characteristic of the first clutch, the variation being attributed to an abrasion of the first clutch disc assembly; and a second abrasion tracking mechanism being provided for the second pressure plate assembly in order to reduce variation in a load characteristic of the second clutch, the variation attributed to an abrasion of the second clutch disc assembly.

14. The clutch device recited in claim 1, wherein the coupling maintaining force of the intermediate elastic member is set so that the power in the first clutch and the power in the second clutch are substantially equal to a creep torque.

15. The clutch device recited in claim 1, further comprising an assist drive part being configured to input an assist torque to at least one of the first input shaft and the second input shaft.

* * * * *